(12) United States Patent
Bai et al.

(10) Patent No.: US 11,546,038 B2
(45) Date of Patent: Jan. 3, 2023

(54) BEAM SWEEPING PATTERNS FOR SINGLE FREQUENCY NETWORK BROADCAST CHANNEL

(71) Applicant: QUALCOMM Incorporated, San Diego, CA (US)

(72) Inventors: Tianyang Bai, Somerville, NJ (US); Junyi Li, Chester, NJ (US); Sungwoo Park, San Diego, CA (US); Wooseok Nam, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 90 days.

(21) Appl. No.: 16/951,306

(22) Filed: Nov. 18, 2020

(65) Prior Publication Data

US 2021/0194561 A1 Jun. 24, 2021

Related U.S. Application Data

(60) Provisional application No. 62/950,920, filed on Dec. 19, 2019.

(51) Int. Cl.
*H04B 7/06* (2006.01)
*H04W 16/28* (2009.01)
*H04L 5/00* (2006.01)

(52) U.S. Cl.
CPC ......... *H04B 7/0695* (2013.01); *H04B 7/0617* (2013.01); *H04L 5/0055* (2013.01); *H04W 16/28* (2013.01)

(58) Field of Classification Search
CPC ............... H04B 7/0695; H04B 7/0617; H04W 16/28; H04L 5/0055
See application file for complete search history.

(56) References Cited

U.S. PATENT DOCUMENTS

| 2011/0065448 | A1* | 3/2011 | Song | H04L 5/0057 |
| | | | | 455/452.2 |
| 2015/0117323 | A1* | 4/2015 | Hiben | H04W 4/06 |
| | | | | 370/329 |
| 2019/0372727 | A1* | 12/2019 | Joseph | H04L 5/0091 |
| 2021/0281308 | A1* | 9/2021 | Wong | H04B 7/0408 |

* cited by examiner

*Primary Examiner* — Brian P Cox
(74) *Attorney, Agent, or Firm* — Holland & Hart LLP

(57) ABSTRACT

Methods, systems, and devices for wireless communications are described. The method includes a method for wireless communications at a base station. The method includes transmitting a message to a number of user equipments (UEs) over a single frequency network channel using a first beam sweep pattern. The method also includes identifying a second beam sweep pattern from a plurality of beam sweep patterns that is different from the first beam sweep pattern for retransmissions of the message. The method further includes transmitting a retransmission of the message to the plurality of UEs over the single frequency network channel using the second beam sweep pattern.

30 Claims, 18 Drawing Sheets

BEAM SWEEPING PATTERNS FOR SINGLE FREQUENCY NETWORK BROADCAST CHANNEL

CROSS REFERENCE

The present application for patent claims the benefit of U.S. Provisional Patent Application No. 62/950,920 by Bai et al., entitled "BEAM SWEEPING PATTERNS FOR SINGLE FREQUENCY NETWORK BROADCAST CHANNEL," filed Dec. 19, 2019, assigned to the assignee hereof, and expressly incorporated by reference in its entirety herein.

FIELD OF TECHNOLOGY

The following relates generally to wireless communications and more specifically to beam sweeping patterns for single frequency network broadcast channel.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications systems may use a single frequency network (SFN) channel for transmitting data. The SFN channel may be used for various types of communications in the system, such as, for example, multicast and broadcast communications. Beamformed transmissions may in some cases be used to transmit such communications. The beamformed transmissions, however, may be prone to shorter delay spread, narrowband fading, and other challenges that may cause interference at a UE receiving broadcast data from multiple sources.

SUMMARY

The described techniques relate to improved methods, systems, devices, and apparatuses that support beam sweeping patterns techniques for single frequency networks. Generally, the described techniques provide for the reduction of interference for broadcast transmissions between a base station and user equipment in a single frequency network (SFN) channel.

In some cases, a base station may communicate using a number of transmission beams with a UE and may use one or more transmission beams ordered according to a first beam sweep pattern to send a message over the SFN channel. The transmission beams, however, may be associated with increased interference at a UE (e.g., due to interfering transmission beams from neighboring base stations), and the UE may transmit hybrid automatic repeat request (HARQ) feedback (e.g., a negative acknowledgment (NACK)) to the base station indicating that the broadcast message was improperly received, or that the broadcast message was not received at all. A UE may, in some examples, request retransmission of the broadcast message using the NACK or by using other signaling, or the UE may otherwise be configured to receive retransmissions from the base station. The base station may adjust the first beam sweep pattern used to transmit the message to a second beam sweeping pattern by adjusting the order, frequency, or timing of the transmission beams. The base station may transmit a retransmission of the message to the UE over the SFN channel using the second beam sweep pattern.

A method of wireless communications at a base station is described. The method may include transmitting a message to a set of user equipment (UEs) over a single frequency network channel using a first beam sweep pattern, identifying a second beam sweep pattern from a set of beam sweep patterns that is different from the first beam sweep pattern for retransmissions of the message, and transmitting a retransmission of the message to the set of UEs over the single frequency network channel using the second beam sweep pattern.

An apparatus for wireless communications at a base station is described. The apparatus may include a processor, memory coupled with the processor, and instructions stored in the memory. The instructions may be executable by the processor to cause the apparatus to transmit a message to a set of user equipment (UEs) over a single frequency network channel using a first beam sweep pattern, identify a second beam sweep pattern from a set of beam sweep patterns that is different from the first beam sweep pattern for retransmissions of the message, and transmit a retransmission of the message to the set of UEs over the single frequency network channel using the second beam sweep pattern.

Another apparatus for wireless communications at a base station is described. The apparatus may include means for transmitting a message to a set of user equipment (UEs) over a single frequency network channel using a first beam sweep pattern, identifying a second beam sweep pattern from a set of beam sweep patterns that is different from the first beam sweep pattern for retransmissions of the message, and transmitting a retransmission of the message to the set of UEs over the single frequency network channel using the second beam sweep pattern.

A non-transitory computer-readable medium storing code for wireless communications at a base station is described. The code may include instructions executable by a processor to transmit a message to a set of user equipment (UEs) over a single frequency network channel using a first beam sweep pattern, identify a second beam sweep pattern from a set of beam sweep patterns that is different from the first beam sweep pattern for retransmissions of the message, and transmit a retransmission of the message to the set of UEs over the single frequency network channel using the second beam sweep pattern.

Some examples of the method, apparatuses, and non-transitory computer-readable medium described herein may further include operations, features, means, or instructions for receiving a coordination message from a network node indicating a beam sweep pattern coordination between the base station and the network node, where identifying the second beam sweep pattern may be based on the coordination message.

In some examples of the method, apparatuses, and non-transitory computer-readable medium described herein, the second beam sweep pattern may be identified from the set of beam sweep patterns based on a random selection, a rule, or both.

Some examples of the method, apparatuses, and non-transitory computer-readable medium described herein may further include operations, features, means, or instructions for transmitting an indication of the first beam sweep pattern, the second beam sweep pattern, or both.

Some examples of the method, apparatuses, and non-transitory computer-readable medium described herein may further include operations, features, means, or instructions for receiving a negative acknowledgement associated with the message, where transmitting the retransmission of the message may be based on receiving the negative acknowledgement.

In some examples of the method, apparatuses, and non-transitory computer-readable medium described herein, the retransmission may be transmitted automatically.

Some examples of the method, apparatuses, and non-transitory computer-readable medium described herein may further include operations, features, means, or instructions for transmitting an indication indicating resources for receiving the retransmission of the message.

In some examples of the method, apparatuses, and non-transitory computer-readable medium described herein, transmitting the message using the first beam sweep pattern may include operations, features, means, or instructions for transmitting a first set of beams in a first order, and where transmitting the message using the second beam sweep pattern.

In some examples of the method, apparatuses, and non-transitory computer-readable medium described herein, the first set of beams and the second set of beams may be transmitted according to a frequency division multiplexing technique, a time division multiplexing technique, or both.

In some examples of the method, apparatuses, and non-transitory computer-readable medium described herein, the single frequency network channel includes a multimedia broadcast single frequency network channel.

A method of wireless communications at a UE is described. The method may include receiving a message from a first base station over a single frequency network channel according to a first beam sweep pattern and receiving a retransmission of the message from the first base station over the single frequency network channel according to a second beam sweep pattern that is different from the first beam sweep pattern.

An apparatus for wireless communications at a UE is described. The apparatus may include a processor, memory coupled with the processor, and instructions stored in the memory. The instructions may be executable by the processor to cause the apparatus to receive a message from a first base station over a single frequency network channel according to a first beam sweep pattern and receive a retransmission of the message from the first base station over the single frequency network channel according to a second beam sweep pattern that is different from the first beam sweep pattern.

Another apparatus for wireless communications at a UE is described. The apparatus may include means for receiving a message from a first base station over a single frequency network channel according to a first beam sweep pattern and receiving a retransmission of the message from the first base station over the single frequency network channel according to a second beam sweep pattern that is different from the first beam sweep pattern.

A non-transitory computer-readable medium storing code for wireless communications at a UE is described. The code may include instructions executable by a processor to receive a message from a first base station over a single frequency network channel according to a first beam sweep pattern and receive a retransmission of the message from the first base station over the single frequency network channel according to a second beam sweep pattern that is different from the first beam sweep pattern.

Some examples of the method, apparatuses, and non-transitory computer-readable medium described herein may further include operations, features, means, or instructions for receiving an indication of the first beam sweep pattern, the second beam sweep pattern, or both.

Some examples of the method, apparatuses, and non-transitory computer-readable medium described herein may further include operations, features, means, or instructions for identifying the first beam sweep pattern, the second beam sweep pattern, or both, based on the indication.

In some examples of the method, apparatuses, and non-transitory computer-readable medium described herein, the indication includes an explicit indication of the first beam sweep pattern, the second beam sweep pattern, or both, or a rule.

Some examples of the method, apparatuses, and non-transitory computer-readable medium described herein may further include operations, features, means, or instructions for receiving an indication indicating resources for receiving the retransmission of the message.

Some examples of the method, apparatuses, and non-transitory computer-readable medium described herein may further include operations, features, means, or instructions for transmitting a negative acknowledgement associated with the message, where receiving the retransmission of the message may be based on transmitting the negative acknowledgement.

In some examples of the method, apparatuses, and non-transitory computer-readable medium described herein, the single frequency network channel includes a multimedia broadcast single frequency network channel.

DETAILED DESCRIPTION

In some wireless communications systems, a single frequency network (SFN) channel may be used for various communications types such as those associated with multicast and broadcast transmissions. In some cases, devices may implement beam sweep pattern techniques to transmit messages using the SFN channel using a single beam sweep pattern for each transmitting device. The beam sweep patterns, however, may be associated with shorter delay spread, narrowband fading, and increased interference at a UE, which may be receiving a broadcast message from multiple base stations in the SFN, each message arriving at the same time as a message from a different device.

The UE may transmit feedback to the base station (e.g., HARQ feedback such as a NACK) to notify the base station that the broadcast message was improperly received due to interference, or that the broadcast message was not received at all. In some cases, the UE may transmit a NACK to request a retransmission of the broadcast message that was originally transmitted from the base station or multiple base stations.

To reduce interference and increase communications quality, one or more base stations in the network may retransmit the broadcast message and may apply various beam sweeping pattern techniques to the retransmission of the broadcast message. In one example, the base station or base stations may identify a second beam sweep pattern from a number of beam sweep patterns that is different from the beam sweep pattern used to originally transmit the message. In another example, a coordination message from a network node or another of the transmitting base stations may be received by a base station. The coordination message may indicate a beam sweep pattern coordination between the base station and the network node or the one or more additional base stations, and the second beam sweep pattern may be identified based at least in part on the coordination message.

One or more base stations may then transmit a retransmission of the original message to the UE using the second beam sweep pattern. In some cases, the transmission of the retransmission is transmitted automatically.

Aspects of the disclosure are initially described in the context of wireless communications systems. Additional aspects of the disclosure are described with respect to various frequency diversity techniques implemented by a base station to reduce interference for broadcast transmissions to a UE in an SFN. Aspects of the disclosure are further illustrated by and described with reference to apparatus diagrams, system diagrams, and flowcharts that relate to frequency diversity techniques for single frequency networks.

Figure 1:
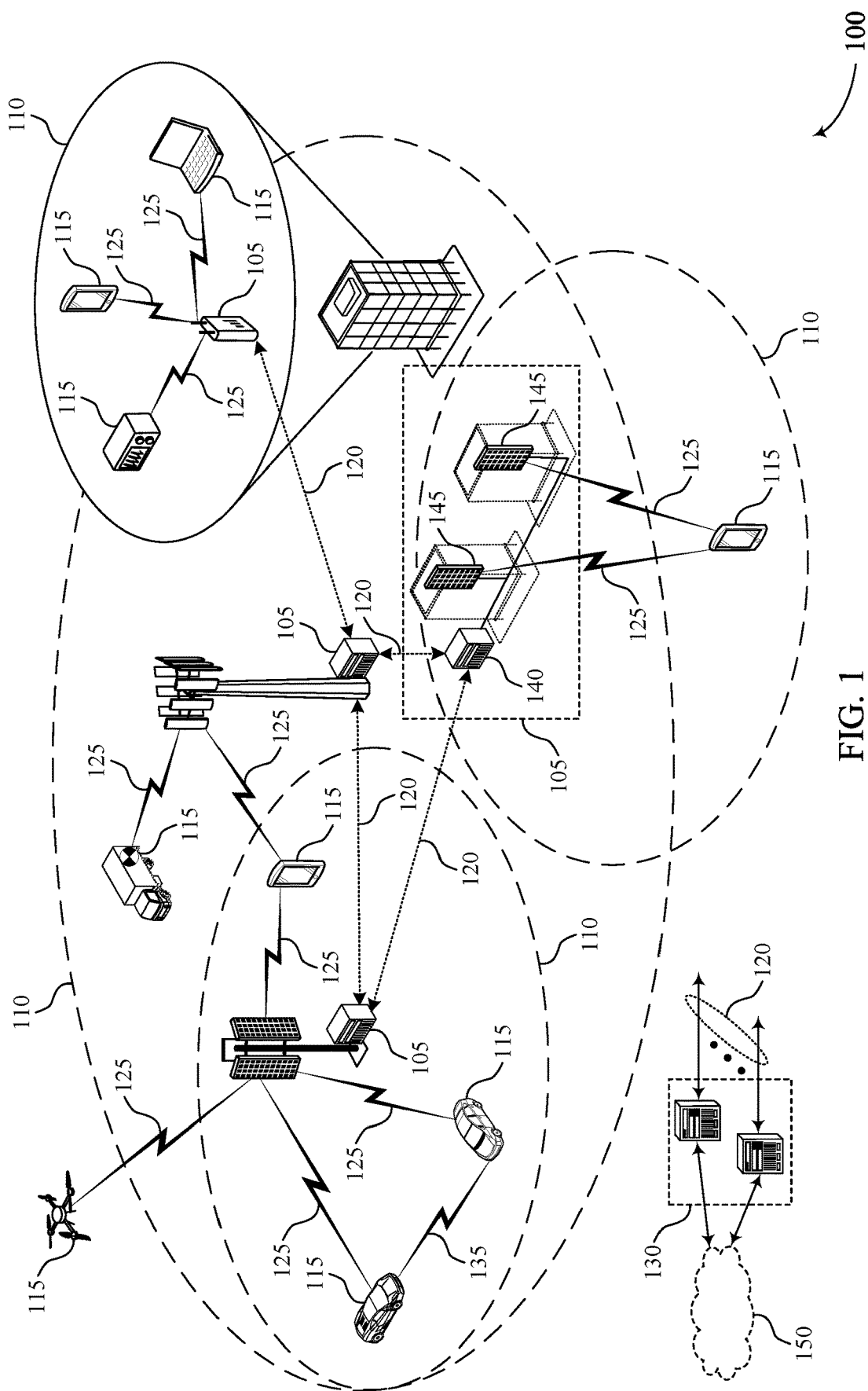
FIG. 1 illustrates an example of a system for wireless communications that supports beam sweeping patterns for single frequency network broadcast channel in accordance with aspects of the present disclosure.

FIG. 1 illustrates an example of a wireless communications system 100 that supports beam sweeping pattern techniques for single frequency networks in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples, the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, wireless communications system 100 may be an example of an SFN which may support multicast and broadcast transmissions, among other communications types. In some cases, devices such as a base station 105 may communicate using a beam sweep pattern including a number of transmission beams to communicate with a UE 115. The use of a single beam sweep pattern, however, may be associated with increased interference at a UE 115.

In some cases, UE 115 may transmit a NACK to the base station 105 indicating that the broadcast message was improperly received, or that the broadcast message was not received at all. The UE 115 may, in some examples, request retransmission of the broadcast message using the NACK or by using other signaling. In some examples, a base station 105 may be configured to send retransmissions of the broadcast message automatically (e.g., even in the absence of a NACK). To reduce interference and increase communications quality, the base station 105 may apply various beam sweeping pattern techniques to the retransmission of the broadcast message. Each base station 105 in the SFN may use differing beam sweep patterns as part of a transmission or a retransmission to the UE.

Aspects of the disclosure are initially described in the context of wireless communications systems. Additional aspects of the disclosure are described with respect to various beam sweeping pattern techniques implemented by a base station to reduce interference for broadcast transmissions to a UE in an SFN. Aspects of the disclosure are further illustrated by and described with reference to apparatus diagrams, system diagrams, and flowcharts that relate to beam sweeping pattern techniques for single frequency networks.

Figure 2:
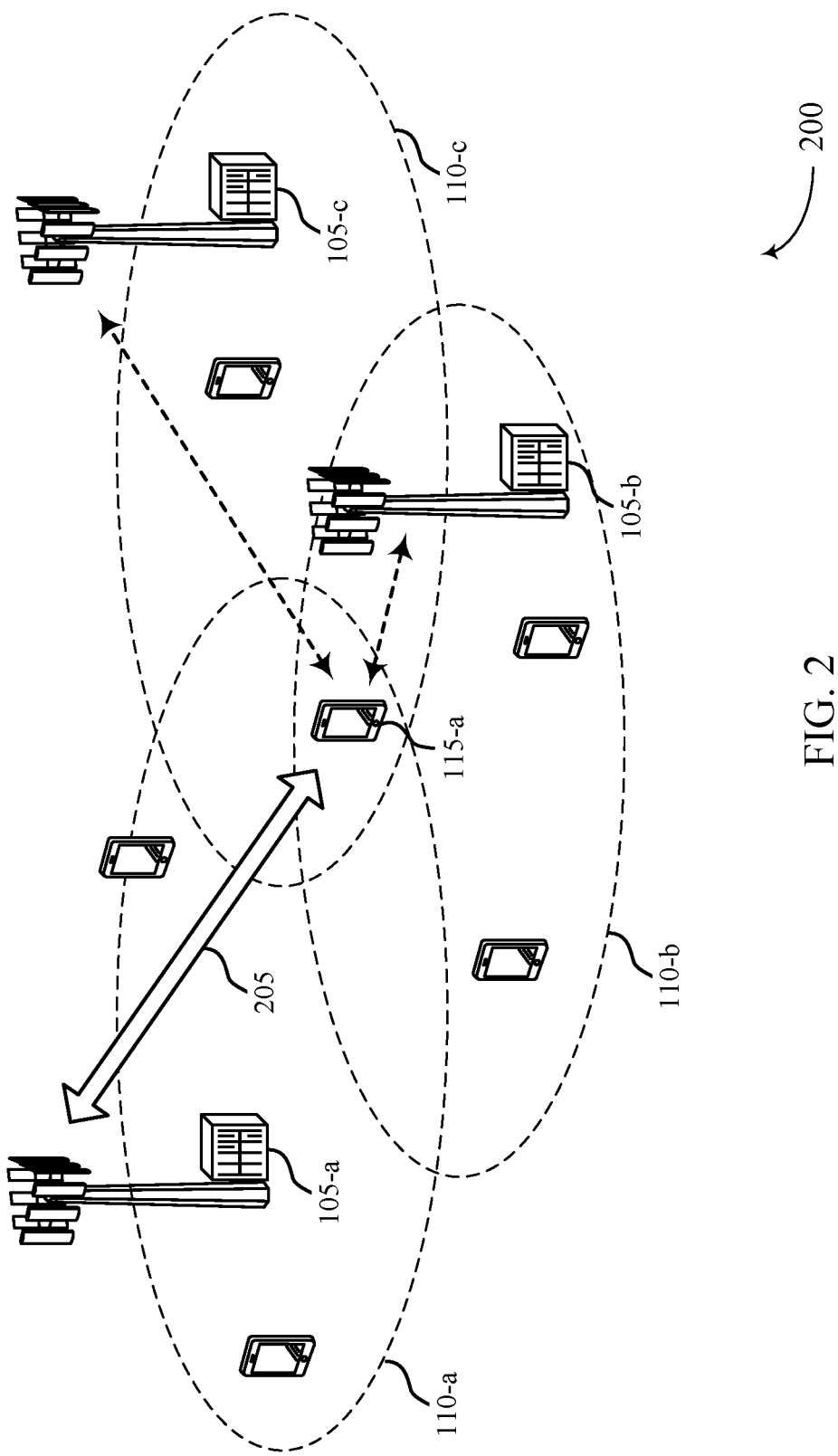
FIG. 2 illustrates an example of a wireless communication system that supports beam sweeping patterns for single frequency network broadcast channel in accordance with aspects of the present disclosure.

FIG. 2 illustrates an example of a wireless communications system 200 that supports beam sweeping pattern techniques for single frequency networks in accordance with aspects of the present disclosure. In some examples, wireless communications system 200 may implement aspects of wireless communications system 100. The wireless communications system 200 may include base stations 105-a, 105-b, and 105-c along with a UE 115-a, which may be examples of a base station 105 and a UE 115 as described with reference to FIG. 1.

Wireless communications system 200 may include a number of base stations 105, each simultaneously supporting communications for various UEs 115 in the system. In wireless communications system 200, one or more base stations 105 may transmit downlink data to a UE 115-a or group of UEs via communication links 205 to increase the chances that the UE 115-a or group of UEs successfully receives the downlink data. In some cases, the wireless communications system 200 may include multiple cells 110 as part of a single frequency network (SFN), where each of the base stations 105 may use the same frequency band to transmit downlink data. In an SFN, a group of UEs may receive the same downlink data by sharing resources used for data transmission. For example, base station 105-a may coordinate with base stations 105-b and 105-c to transmit data using broadcast or multicast techniques over a given dedicated area (e.g., the area of wireless communications system 200). In such cases, the base stations 105 may use a single frequency band to transmit downlink data to UE 115-a or the group of UEs to save resources and increase network efficiency.

In some wireless communications systems including NR networks (e.g., mmW systems supporting >24 GHz frequencies), various techniques such as error correction, HARQ, and signal retransmission may be employed to boost signal to noise ratio (SNR) and improve communications reliability.

In addition, feedback such as ACK/NACK feedback transmitted from receiving UEs may prompt data retransmissions in wireless networks (e.g., SFNs) which may support delay-sensitive and high reliability applications (e.g., eMBB, URLLC). In some cases, however, a base station 105 may receive acknowledgement (ACK) messages from multiple UEs 115, and a delay in receiving the ACK messages from all of the UEs 115 may be associated with inefficient usage of network resources. Additionally or alternatively, a UE 115 may receive a broadcast/multicast message from a base station 105 which may collide with an ACK/NACK transmission or data retransmission transmitted on the SFN broadcast channel (e.g., such as in cases of narrowband fading). In such cases, frequency diversity may be increased for retransmissions using techniques such as multiplexing (e.g., spatial multiplexing, FDM, TDM, etc.), frequency hopping, and applied cyclic diversity delays may be employed to make the SFN channel more robust. In addition, different beam sweep parameters may be used to send retransmissions in the SFN.

In one example, a UE 115 or base station 105 may use directional beamforming to focus energy from a transmission in one or more directions. In some cases, directional beams may be used in combination with transmit diversity to improve coverage and signal strength of received transmissions. In some other cases, however, the use of directional beams may shorten the delay spread of the channel and may reduce the frequency diversity of received signals (e.g., channel fading may be more frequency-flat). In some other examples, a UE 115 may receive from multiple different transmission reception points (TRPs) associated with a base station or multiple base stations, and the UE 115 may combine the received signals from different TRPs or base stations together. In such examples, the UE may receive the data from the TRPs using one or more directional beams.

In another example, a base station 105 may use various multiplexing techniques to broadcast data to a group of UEs (e.g., to each UE 115 in the cell). For example, a base station 105 may transmit the same information in different directions in a TDM/FDM manner using different beams (e.g., using beam sweeping). In some cases, base station 105 may use spatial multiplexing to transmit different streams of data simultaneously on the same frequency. In such cases, the data streams may be transmitted to a single UE to increase the data rate or to multiple UEs to increase system capacity. In addition, a network may indicate a relaxed (e.g., increased) initial block error rate (BLER) rate to increase the capacity of the system while maintaining a given quality of service (QoS) for communications.

In some cases, UE 115-a may incorrectly receive downlink data from one or more base stations 105 (e.g., the data may be corrupted), or UE 115-a may fail to receive the downlink data altogether. UE 115-a may attempt various error recovery techniques to recover data that may be lost during a broadcast/multicast transmission. For example, UE 115-a may transmit HARQ feedback to base station 105-a to notify the base station of an error in receipt of the transmission (e.g., NACK), or to acknowledge successful receipt of a transmission (e.g., ACK). The base station 105-a may use HARQ feedback it receives to determine whether to retransmit the downlink data. For example, the retransmission may be triggered when the base station 105-b receives a NACK by one or multiple UEs in the network (e.g., the retransmission may be triggered by a HARQ process).

In the example of an SFN, the base station 105-a may retransmit the data as requested by UE 115-a as a broadcast/multicast transmission to each of the UEs 115. Because the base station 105-a transmits to each of the UEs 115 (e.g., not just to UE 115-a) in the broadcast transmission, base station 105-a may determine whether to retransmit the data based on various factors, such as a threshold error rate or a number of NACKs received from UEs in the network. In another case, base station 105-a may autonomously send a retransmission to UE 115-a, and UE 115-a may be configured to expect a retransmission from base station 105-a (e.g., UE 115-a may be configured to receive the same information from broadcast transmissions multiple times). In such autonomous retransmissions, the transmission beams used in later retransmissions may be the same as the beams used for the first transmission of the data.

In some cases, signals transmitted to UE 115-a from a base station or multiple base stations in the SFN may suffer from interference (e.g., channels at allocated tones for the SFN may experience poor communications quality). For example, UE 115-a may communicate with base station 105-a, and may receive interference associated with other base stations in the network (e.g., the sum of channels from neighboring base stations may interfere and cause decreased communications quality). In some other examples, self-interference of the network may occur due to transmission delays from different base stations in the network broadcasting a message to the UE 115-a. In such cases, the UE 115-a may not request a retransmission of a signal, because the retransmission may encounter similar challenges as the original transmission (e.g., the retransmission may encounter similar interference from simultaneously transmitting base stations in the SFN).

Figure 3:
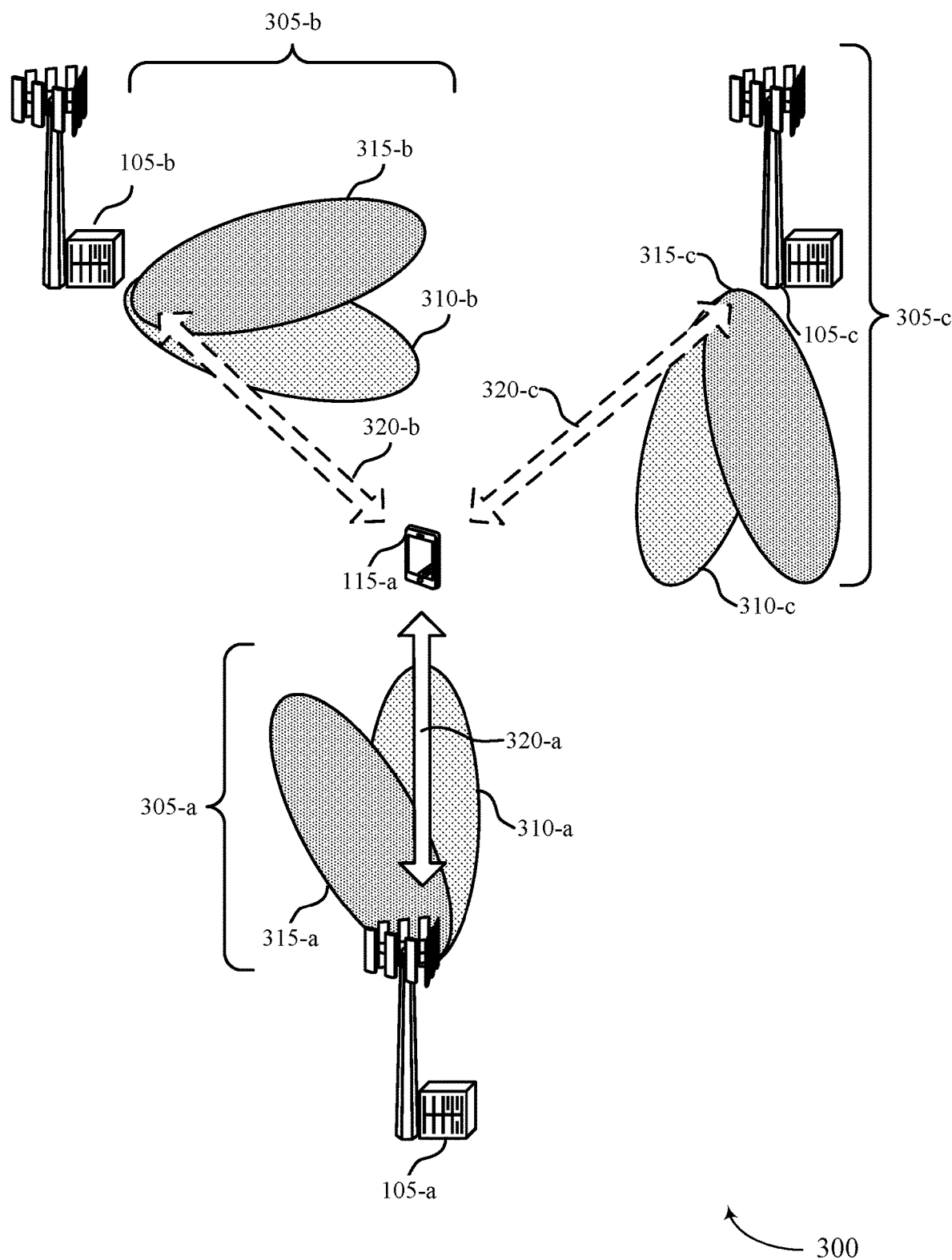
FIG. 3 illustrates an example of a wireless communication system that supports beam sweeping patterns for a single frequency network broadcast channel in accordance with aspects of the present disclosure.

FIG. 3 illustrates an example of a wireless communications system 300 that supports beam sweeping patterns for single frequency network broadcast channel in accordance with aspects of the present disclosure. The wireless communications system 300, which may be an example of a system for data transmitting, includes a first base station 105-a, a second base station 105-b, a third base station 105-c, and a UE 115-a. In some examples, wireless communications system 300 may implement aspects of wireless communications systems 100 or 200 as described herein with reference to FIGS. 1 and 2. Additionally, the wireless communications system 300 may include additional or alternative components including additional base stations 105, UEs 115, or both.

The base stations 105 and the UE 115-a may be configured to perform wireless communications in a mmW network. For example, the base stations 105 may include a transmitter array that includes a number antenna elements that may be used by the base stations 105 to configure a beamformed signal for wireless transmission to the UE 115-a. Additionally, the UE 115-a may have a receiver array that includes a number of receiver antenna elements that are used by the UE 115-a to receive signals from the base stations 105 in a directional manner. The transmitter arrays of the base stations 105 may also be used for beamformed reception and the receiver array of the UE 115-a may also be used for transmitting beamformed signals. For example, the base stations 105 and the UE 115-a may utilize digital or analog techniques to control one or more of the antenna elements of both of the base stations 105 and the UE 115-a in order to perform wireless communications using beamformed signals. In some cases, the base stations 105 and the UE 115-a may use beamforming techniques in a mmW network for access traffic or backhaul traffic (e.g., an IAB network).

The wireless communications system 300 illustrates an example of a single UE 115 (e.g., UE 115-a) in communication with three base stations 105 (e.g., a first base station 105-a, a second base station 105-b, and a third base station 105-c). With reference to FIG. 3, the first base station 105-a may be the serving base station 105 and the second base station 105-b and the third base station 105-c may be neighboring base stations 105. As part of the wireless communications system 300, one or more of the base stations 105 may transmit downlink data to the UE 115-a via communication links 320. More specifically, the first base station 105-a may communicate with the UE 115-a via the communication link 320-a, the second base station 105-b may communicate with the UE 115-a via the communication link 320-b, and the third base station 105-c may communicate with the UE 115-a via the communication link 320-c as a respective base station 105 becomes the serving base station for the UE 115-a.

As part of transmitting downlink data to the UE 115-a via the respective communication links 320, each of the base stations 105 may cover the UE 115-a with one or more transmission beams. More specifically, each of the base stations 105 may sweep a first transmission beam 310 and a second transmission beam 315 across a respective communication link 320 according to a beam sweep pattern 305. The serving base station 105 or one or more of the neighboring base stations 105 may transmit or otherwise provide an indication of the beam sweep pattern 305 to the UE 115-a. In some cases, the base stations 105 may transmit or otherwise provide an indication of the beam sweep pattern (e.g., beam sweep pattern 305) to the UE 115-a. In some cases, UE 115-a may transmit an indication of a requested beam sweep pattern to one or more of the base stations 105.

With reference to FIG. 3, the first base station 105-a may transmit downlink data to the UE 115-a via a first transmission beam 310-a and a second transmission beam 315-a arranged according to a first beam sweep pattern 305-a. The second base station 105-b may transmit downlink data to the UE 115-a via a first transmission beam 310-b and a second transmission beam 315-b arranged according to a second beam sweep pattern 305-b. The third base station 105-c may transmit downlink data to the UE 115-a via a first transmission beam 310-c and a second transmission beam 315-c arranged according to a second beam sweep pattern 305-a. In this case, each the first beam sweep pattern 305-a, the second beam sweep pattern 305-b, and the third beam sweep pattern 305-c are the same.

For an initial transmission of downlink data to the UE 115-a, as illustrated in FIG. 3, each of the beam sweep patterns 305 may be the same. During the transmission of downlink data from one of the base stations 105 to the UE 115-a via a respective one of the communication links 320, the first transmission beam 310 is swept across the communication link 320 and then the second beam 315 is swept across the communication link 320. Each of the beam sweep patterns 305 includes an arrangement of the first transmission beam 310 and the second beam 315 in a first order. More specifically, the first transmission beam 310 and the second beam 315 associated with the beam sweep pattern 305 of each of the base stations 105 are positioned in an order such that the first transmission beam 310 will be swept across a respective communication link 320 first in order and then the second beam 315 will be swept across the respective communication link 320 second in order. In this example, the beam sweep patterns 305 are determined to configure the first transmission beams 310 and the second transmission beams 315 to sweep across the UE 115-a according to time division multiplexing (TDM). In some examples, the beam sweep patterns 305 may be determined to configure the first transmission beams 310 and the second transmission beams 315 to sweep across the UE 115-a according to frequency division multiplexing (FDM) or according to another type of beam modulation.

Figure 4:
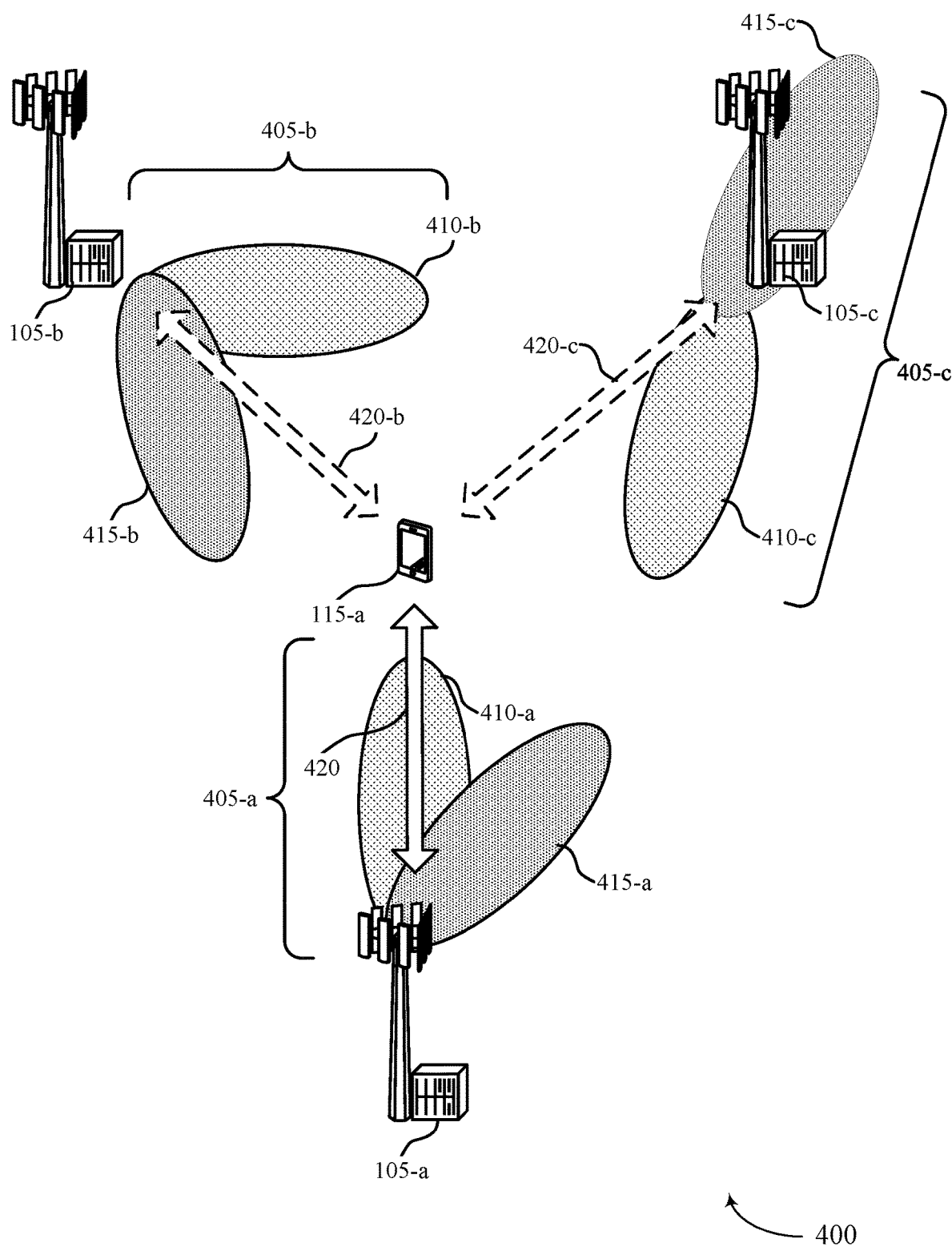
FIG. 4 illustrates an example of a wireless communication system that supports beam sweeping patterns for single frequency network broadcast channel in accordance with aspects of the present disclosure.

FIG. 4 illustrates an example of a wireless communications system 400 that supports beam sweeping patterns for single frequency network broadcast channel in accordance with aspects of the present disclosure. The wireless communications system 400, which may be an example of a system for data transmitting, includes a first base station 105-a, a second base station 105-b, a third base station 105-c, and a UE 115-a. Each of the base stations 105 may transmit a retransmission of downlink data to the UE 115-a using first transmission beams 410 and second transmission beams 415 via communication links 420. In some examples, wireless communications system 400 may implement aspects of wireless communications systems 100, 200, or 300 as described herein with reference to FIGS. 1 and 2. For example, the first transmission beams 410 may be examples of the first transmission beams 310 and the second transmission beams 415 may be examples of the second transmission beams 315. Additionally, the wireless communications system 400 may include additional or alternative components including additional base stations 105, UEs 115, or both.

The base stations 105 and the UE 115-a may be configured to perform wireless communications in a mmW network. For example, the base stations 105 may include a transmitter array that includes a number of antenna elements that may be used by the base stations 105 to configure a beamformed signal for wireless transmission to a UE 115-a. Additionally, the UE 115-a may have a receiver array that includes a number of receiver antenna elements that are used by the UE 115-a to receive signals from the base stations 105 in a directional manner. The transmitter arrays of the base stations 105 may also be used for beamformed reception and the receiver array of the UE 115-a may also be used for transmitting beamformed signals. For example, the base stations 105 and the UE 115-a may utilize digital or analog techniques to control one or more of the antenna elements of both of the base stations 105 and the UE 115-a in order to perform wireless communications using beamformed signals. In some cases, the base stations 105 and the UE 115-a may use beamforming techniques in a mmW network for access traffic or backhaul traffic (e.g., an IAB network).

The wireless communications system 400 illustrates an example of a single UE 115 (e.g., UE 115-a) in communication with three base stations 105 (e.g., the first base station 105-a, the second base station 105-b, and the third base station 105-c). The first base station 105-a may be the serving base station 105 and the second base station 105-b and the third base station 105-c may be neighboring base stations 105. As part of the wireless communications system 400, one or more of the base stations 105 may transmit downlink data to the UE 115-a via communication links 420. More specifically, the first base station 105-a may communicate with the UE 115-a via the communication link 420-a, the second base station 105-b may communicate with the UE 115-a via the communication link 420-b, and the third base station 105-c may communicate with the UE 115-a via the communication link 420-c as a respective base station 105 becomes the serving base station for the UE 115-a.

As part of transmitting downlink data to the UE 115-a via the respective communication links 420, and as described herein with reference to FIG. 3, each of the base stations 105 may cover the UE 115-a with one or more transmission beams. More specifically, each of the base stations 105 may sweep a first transmission beam 410 and a second transmission beam 415 across a respective communication link 420 according to a beam sweep pattern 405. The serving base station 105 or one or more of the neighboring base stations 105 may transmit or otherwise provide an indication of the beam sweep pattern 405 to the UE 115-a. In some cases, the base stations 105 may transmit or otherwise provide an indication of the beam sweep pattern (e.g., beam sweep pattern 405) to the UE 115-a. In some cases, UE 115-a may transmit an indication of a requested beam sweep pattern to one or more of the base stations 105.

FIG. 4 illustrates a transmission of a retransmission of downlink data corresponding to a retransmission of the downlink data illustrated as being transmitted initially in FIG. 3. As part of the retransmission of the downlink data, one or more of the beam sweep patterns 405 may be different. During the transmission of the retransmission of the downlink data from one of the base stations 105 to the UE 115-*a* via a respective one of the communication links 420, the first beam 410 and the second beam 415 are swept across the communication link 420 according to a predetermined beam sweep pattern configured to reduce interference between transmissions of the retransmission of the downlink data from neighboring base stations 105. Each of the beam sweep patterns 405 includes an arrangement (e.g., an order) of the first beam 410 and the second beam 415 that is different from a beam sweep pattern used in the initial transmission of downlink data to the UE 115-*a* and that corresponds to a beam sweep pattern determined to reduce interference between the first beams 410 and the second beams 415 of the neighboring base stations 105.

Each of the base stations 105 may identify a beam sweep pattern to use to transmit the retransmission of downlink data to the UE 115-*a*. In some cases, the beam sweep pattern may be selected from a number of available beam sweep patterns based at least in part on a random selection, a rule (e.g., a standardized rule), or both for each of the base stations 105. In some cases, a network node, a controller node, or other type of device in communication with one or more of the base stations 105 may transmit a coordination to one or more of the base stations 105. The coordination message may be received by one or more of the base stations 105 and may indicate a beam sweep pattern coordination between the network node and the one or more base stations 105. In such cases, identifying the second beam sweep pattern at each of the base stations 105 may be based at least in part on the received coordination message. Once the beam sweep pattern for one or more of the base stations 105 has been identified, or more of the base stations 105 may transmit an indication of the initial beam sweep pattern, an indication of the beam pattern to be used for the transmission of the retransmission of downlink data, or both.

As illustrated in FIG. 4, one or more of the beam sweep patterns 405 associated with the base stations 105 may be different with respect to the beam sweep order of the first beam 410 and the second beam 415 within a respective beam sweep pattern 405. Additionally, the beam sweep patterns 405 may be different with respect to the TDM of the first beam 410 and the second beam 415 within each of the beam sweep patterns 405. Such differences within the different beam sweep patterns 405 may be introduced to the beam sweep patterns 405 using the methods described herein to reduce destructive interferences or cancellation between the beams at the UE 115-*a* during initial transmissions or retransmissions of the downlink data by the base stations 105. In some examples, the beam sweep patterns 405 may be adjusted according to the techniques described herein to vary the FDM of the beams within the respective beam sweep patterns 405.

With continued reference to FIG. 4, the beam sweep patterns 405-*a*, 405-*b*, and 405-*c* may be determined by one or more of the base stations 105 or the network node as described herein. According to the first beam sweep pattern 405-*a*, the first base station 105-*a* may sweep the second beam 415-*a* across the communication link 420 before sweeping the first beam 410-*a* across the communication link at a predetermined frequency as part of a beam sweep to transmit the retransmission of downlink data. At a first predetermined time relative to one or more of the first beam sweep pattern 405-*a* or the third beam sweep pattern 405-*c*, the second base station 105-*b* may sweep the second beam 415-*b* across the communication link 420-*b* and may then sweep the first beam 410-*b* across the communication link 420-*b* according to the beam sweep pattern 405-*b*. The third base station 105-*c* may, at a second predetermined time relative to one or more of the first beam sweep pattern 405-*a* and the second beam sweep pattern 405-*b*, sweep the first beam 410-*c* across the third communication link 420-*c* and may then sweep the second beam 415-*c* across the third communication link 420-*c* according to the third beam sweep pattern 405-*c*.

Figure 5:
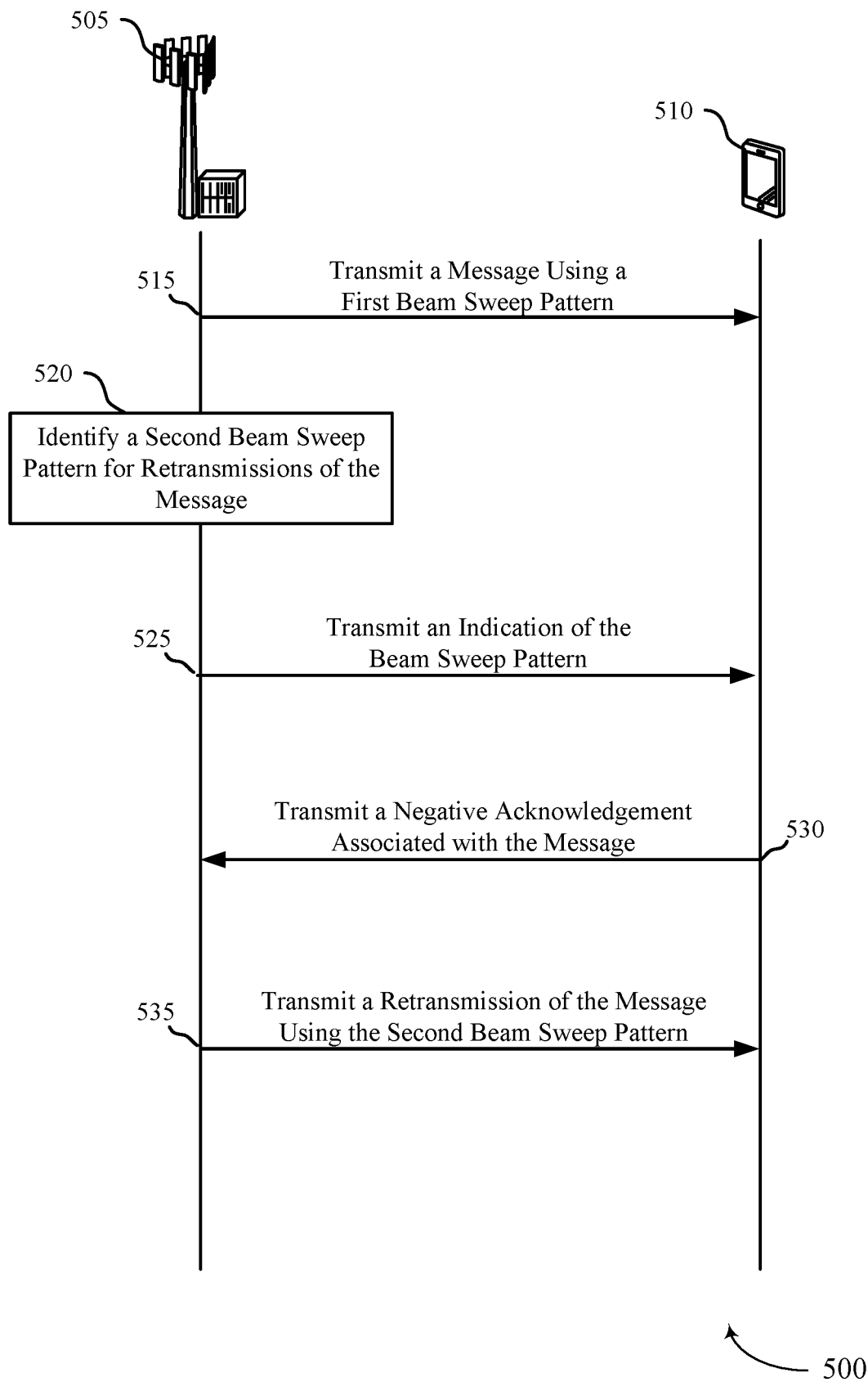
FIG. 5 illustrates an example of a process flow diagram that supports beam sweeping patterns for single frequency network broadcast channel in accordance with aspects of the present disclosure.

FIG. 5 illustrates an example of a process flow 500 that supports beam sweeping patterns for single frequency network broadcast channel in accordance with aspects of the present disclosure. In some examples, process flow 500 may implement aspects of wireless communications system 100. The process flow 500 includes a base station 505 and a user equipment (UE) 510. These may be examples of the corresponding devices described with reference to FIGS. 1 through 4. Alternative examples of the following may be implemented, where some steps are performed in a different order than described or are not performed at all. In some cases, steps may include additional features not mentioned below, or further steps may be added.

At 515, the base station 505 may transmit a message to the UE 510 (e.g., one or more UEs) over a single frequency network channel using a first beam sweep pattern. In some cases, the single frequency network channel may include a multimedia broadcast single frequency network channel. In some cases, the base station 505 may transmit the message to the UE 510 using the first beam sweep pattern including a first number of beams in a first order.

At 520, the base station 505 may identify a second beam sweep pattern from a number of beam sweep patterns that is different from the first beam sweep pattern for retransmissions of the message. In some examples, the second beam sweep pattern is identified at random from a number of beam sweep patterns. In some cases, the base station 505 may identify the second beam sweep pattern based at least in part on a coordination message received from a network node. In such cases, the coordination message may indicate a beam sweep pattern coordination between the base station 505 and the network node.

At 525, the base station 505 may transmit an indication of the first beam sweep pattern, the second beam sweep pattern, or both. For example, the base station 505 may transmit to the UE 510 an indication of the beam sweep pattern identified at 520 by the base station 505.

At 530, the UE 510 may transmit, to the base station 505, a negative acknowledgement associated with the message. For example, as described herein, the UE 510 may provide HARQ feedback to the base station 505 including one of an ACK that indicates successful receipt of a transmission from the base station 505, or a NACK that indicates unsuccessful receipt of a transmission.

At 535, the base station 505 may transmit, to the UE 510, a retransmission of the message to the UE 510 over the single frequency network channel using the second beam sweep pattern. The retransmission of the message to the UE 510 using the second beam sweep pattern may include transmitting a second number of beams in a second order that is different from the first order of the first number of beams associated with the first beam sweep pattern. In such cases, transmitting the retransmission of the message may be based at least in part on receiving, at the base station 505, the negative acknowledgement that was transmitted by the UE 510 at 530. In some cases, the base station 505 may apply one or both of time division multiplexing or frequency division multiplexing to the transmission of the first number of beams and the second number of beams. In some cases, the retransmission of the message may be transmitted automatically. In some cases, the base station 505 may transmit an indication indicating resources for receiving the retransmission of the message.

Figure 6:
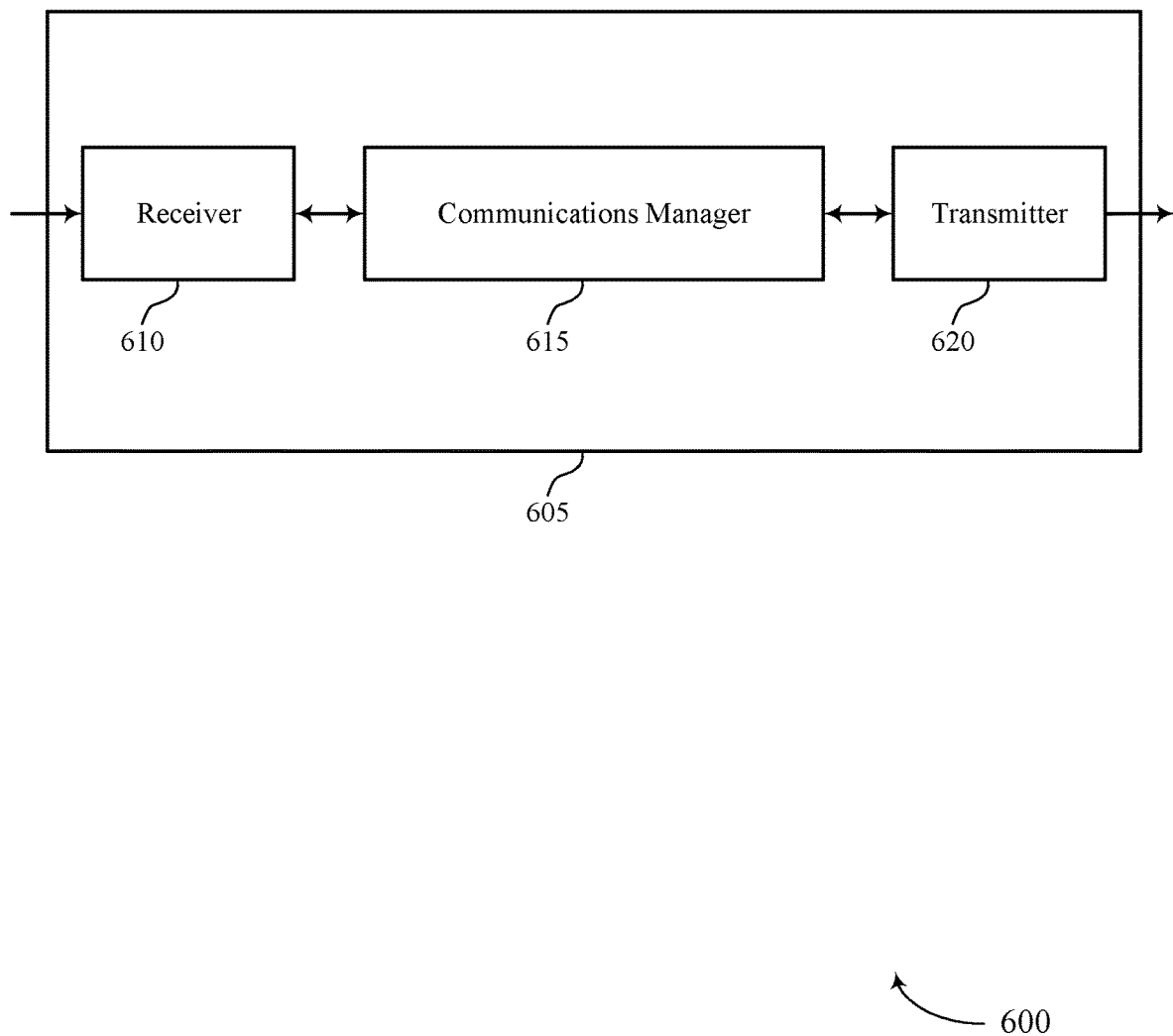
FIGS. 6 and 7 show block diagrams of devices that support beam sweeping patterns for single frequency network broadcast channel in accordance with aspects of the present disclosure.

FIG. 6 shows a block diagram 600 of a device 605 that supports beam sweeping patterns for single frequency network broadcast channel in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to beam sweeping patterns for single frequency network broadcast channel, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may receive a message from a first base station over a single frequency network channel according to a first beam sweep pattern and receive a retransmission of the message from the first base station over the single frequency network channel according to a second beam sweep pattern that is different from the first beam sweep pattern. The communications manager 615 may be an example of aspects of the communications manager 910 described herein.

The actions performed by the communications manager 615 as described herein may be implemented to realize one or more potential advantages. One implementation may allow a UE 115 to save power and increase battery life by transmitting a negative acknowledgement associated with the message, where receiving the retransmission of the message is based at least in part on transmitting the negative acknowledgement. Another implementation may provide improved quality and reliability of service at the UE 115, as latency and the number of separate resources allocated to the UE 115 may be reduced.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
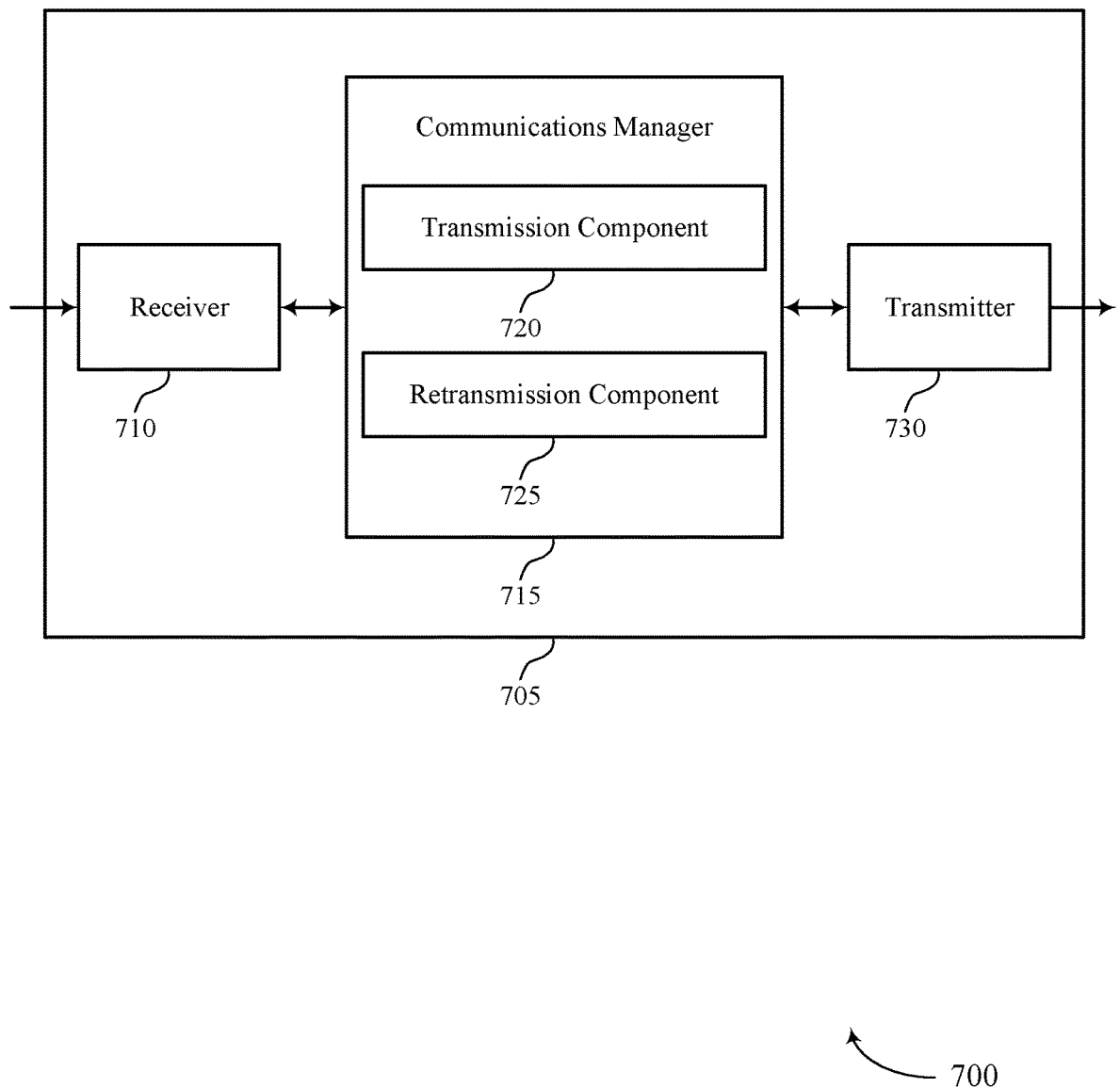

FIG. 7 shows a block diagram 700 of a device 705 that supports beam sweeping patterns for single frequency network broadcast channel in accordance with aspects of the present disclosure. The device 705 may be an example of aspects of a device 605, or a UE 115 as described herein. The device 705 may include a receiver 710, a communications manager 715, and a transmitter 730. The device 705 may also include a processor. Each of these components may be in communication with one another (e.g., via one or more buses).

The receiver 710 may receive information such as packets, user data, or control information associated with various information channels (e.g., control channels, data channels, and information related to beam sweeping patterns for single frequency network broadcast channel, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a transmission component 720 and a retransmission component 725. The communications manager 715 may be an example of aspects of the communications manager 910 described herein.

The transmission component 720 may receive a message from a first base station over a single frequency network channel according to a first beam sweep pattern.

The retransmission component 725 may receive a retransmission of the message from the first base station over the single frequency network channel according to a second beam sweep pattern that is different from the first beam sweep pattern.

The transmitter 730 may transmit signals generated by other components of the device 705. In some examples, the transmitter 730 may be collocated with a receiver 710 in a transceiver module. For example, the transmitter 730 may be an example of aspects of the transceiver 920 described with reference to FIG. 9. The transmitter 730 may utilize a single antenna or a set of antennas.

Figure 8:
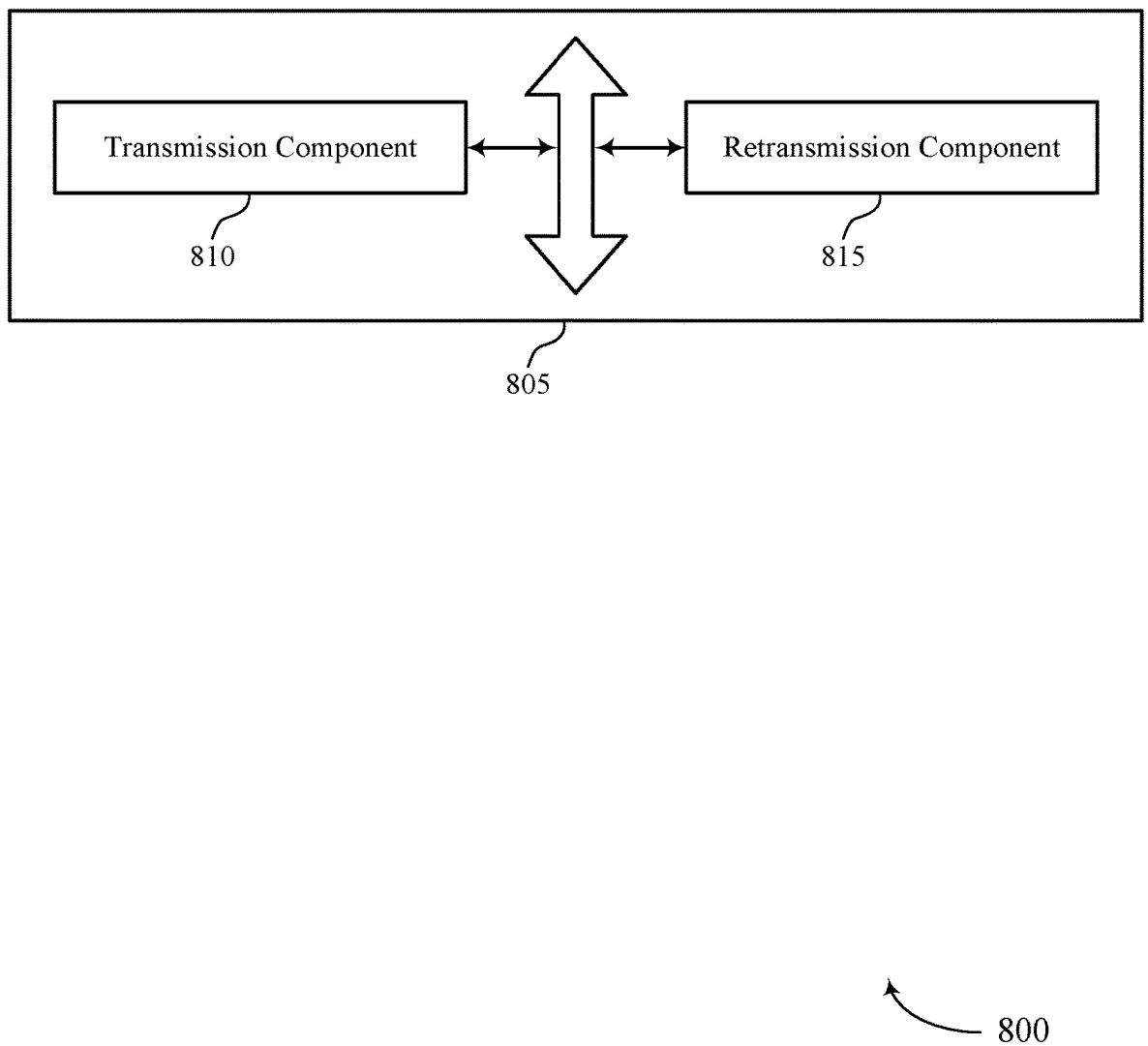
FIG. 8 shows a block diagram of a communications manager that supports beam sweeping patterns for single frequency network broadcast channel in accordance with aspects of the present disclosure.

FIG. 8 shows a block diagram 800 of a communications manager 805 that supports beam sweeping patterns for single frequency network broadcast channel in accordance with aspects of the present disclosure. The communications manager 805 may be an example of aspects of a communications manager 615, a communications manager 715, or a communications manager 910 described herein. The communications manager 805 may include a transmission component 810 and a retransmission component 815. Each of these modules may communicate, directly or indirectly, with one another (e.g., via one or more buses).

The transmission component 810 may receive a message from a first base station over a single frequency network channel according to a first beam sweep pattern. In some examples, the transmission component 810 may transmit a negative acknowledgement associated with the message, where receiving the retransmission of the message is based on transmitting the negative acknowledgement. The retransmission component 815 may receive a retransmission of the message from the first base station over the single frequency network channel according to a second beam sweep pattern that is different from the first beam sweep pattern.

In some examples, the retransmission component 815 may receive an indication of the first beam sweep pattern, the second beam sweep pattern, or both. In some examples, the retransmission component 815 may receive an indication indicating resources for receiving the retransmission of the message.

Figure 9:
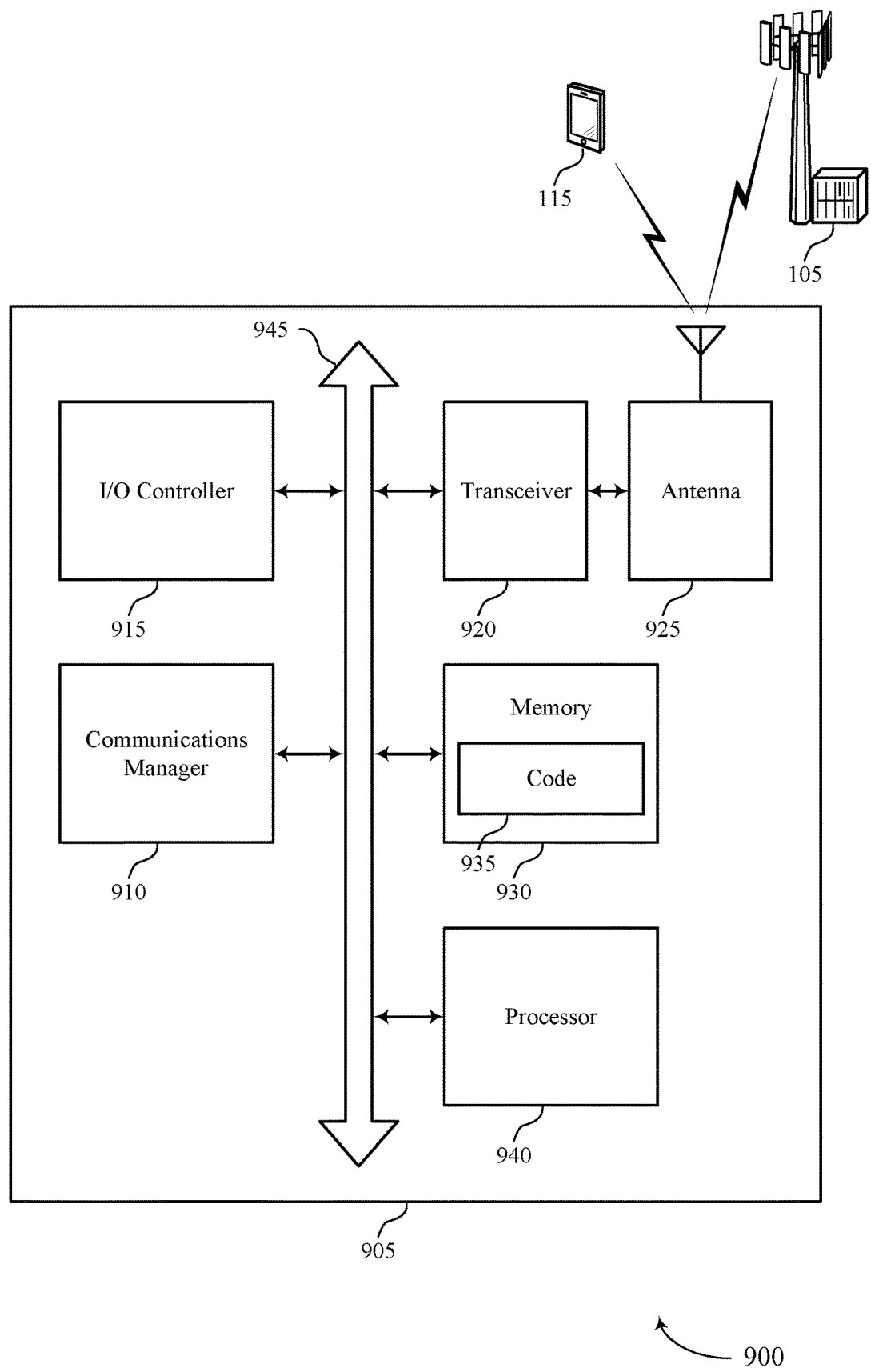
FIG. 9 shows a diagram of a system including a device that supports beam sweeping patterns for single frequency network broadcast channel in accordance with aspects of the present disclosure.

FIG. 9 shows a diagram of a system 900 including a device 905 that supports beam sweeping patterns for single frequency network broadcast channel in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may receive a message from a first base station over a single frequency network channel according to a first beam sweep pattern and receive a retransmission of the message from the first base station over the single frequency network channel according to a second beam sweep pattern that is different from the first beam sweep pattern.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described herein. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random-access memory (RAM) and read-only memory (ROM). The memory 930 may store computer-readable, computer-executable code 935 including instructions that, when executed, cause the processor to perform various functions described herein. In some cases, the memory 930 may contain, among other things, a basic I/O system (BIOS) which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting beam sweeping patterns for single frequency network broadcast channel).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

The actions performed by the processor 940, memory 930, I/O controller 915, communications manager 910, transceiver 920, and antenna 925 as described herein may be implemented to realize one or more potential advantages. One implementation may allow the device 905 to save power and increase battery life by receiving the retransmission of the message over the single frequency network channel using the second beam sweep pattern. Another implementation may provide improved data throughput and user experience at the device 905 through the reduction of signaling overhead.

Figure 10:
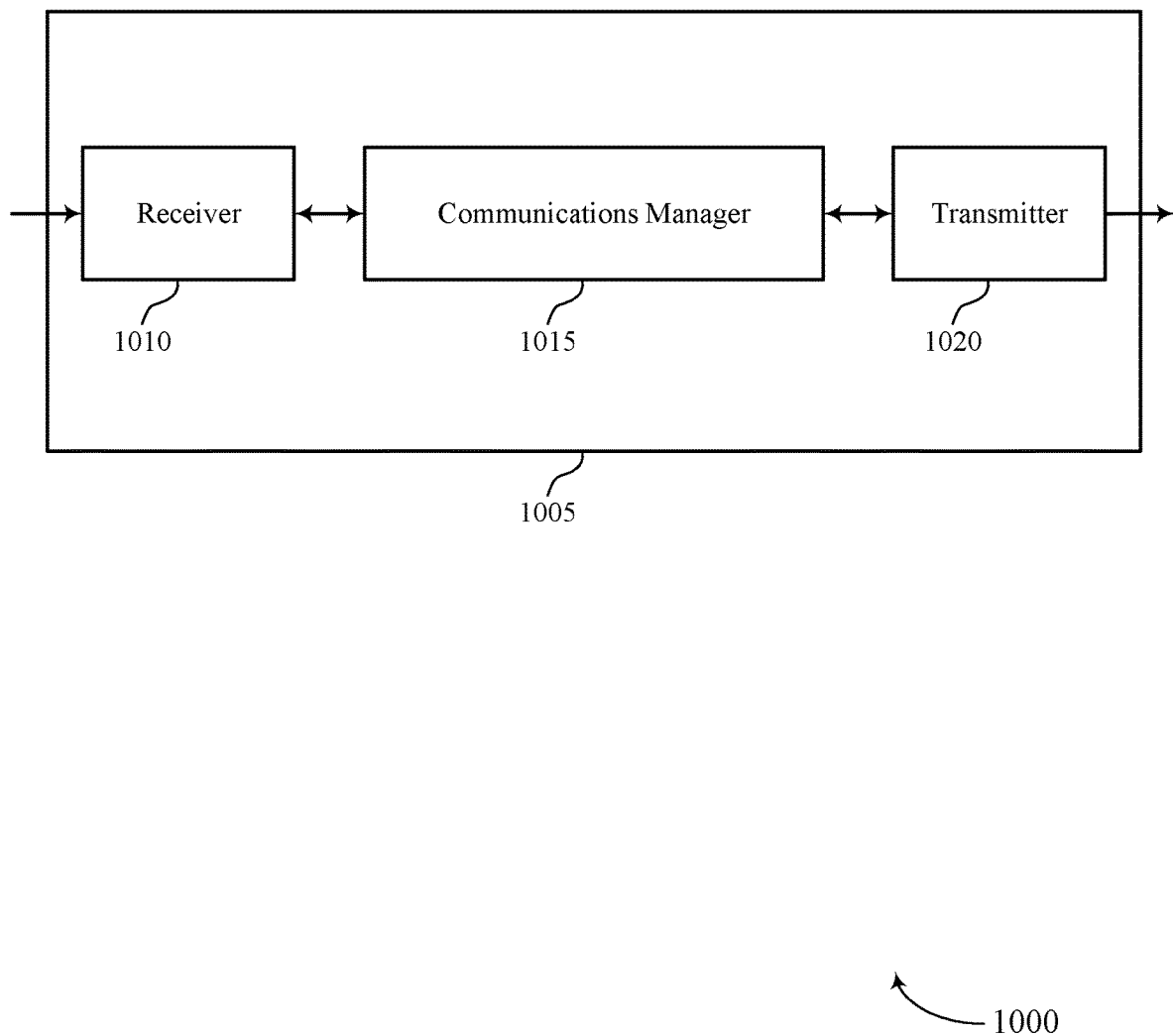
FIGS. 10 and 11 show block diagrams of devices that support beam sweeping patterns for single frequency network broadcast channel in accordance with aspects of the present disclosure.

FIG. 10 shows a block diagram 1000 of a device 1005 that supports beam sweeping patterns for single frequency network broadcast channel in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to beam sweeping patterns for single frequency network broadcast channel, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may transmit a message to a set of user equipment (UEs) over a single frequency network channel using a first beam sweep pattern, identify a second beam sweep pattern from a set of beam sweep patterns that is different from the first beam sweep pattern for retransmissions of the message, and transmit a retransmission of the message to the set of UEs over the single frequency network channel using the second beam sweep pattern. The communications manager 1015 may be an example of aspects of the communications manager 1310 described herein.

The actions performed by the communications manager 1015 as described herein may be implemented to realize one or more potential advantages. One implementation may allow a base station 105 to save power and increase battery life by receiving a negative acknowledgement associated with the message, where receiving the retransmission of the message is based at least in part on transmitting the negative acknowledgement. Another implementation may provide improved quality and reliability of service at the base station 105, as latency and the number of separate resources allocated to the base station 105 may be reduced.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an application-specific integrated circuit (ASIC), an FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
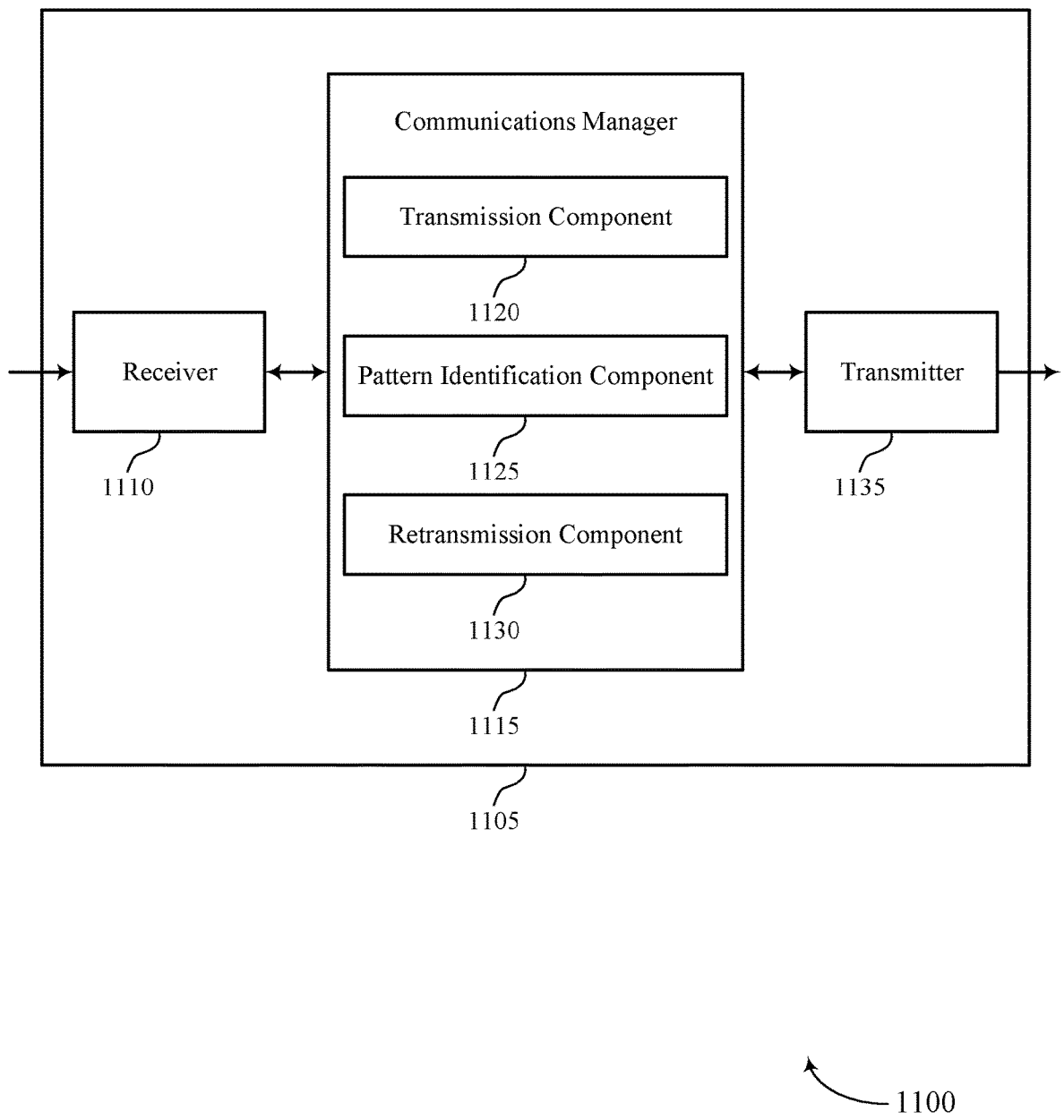

FIG. 11 shows a block diagram 1100 of a device 1105 that supports beam sweeping patterns for single frequency network broadcast channel in accordance with aspects of the present disclosure. The device 1105 may be an example of aspects of a device 1005, or a base station 105 as described herein. The device 1105 may include a receiver 1110, a communications manager 1115, and a transmitter 1135. The device 1105 may also include a processor. Each of these components may be in communication with one another (e.g., via one or more buses).

The receiver 1110 may receive information such as packets, user data, or control information associated with various information channels (e.g., control channels, data channels, and information related to beam sweeping patterns for single frequency network broadcast channel, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a transmission component 1120, a pattern identification component 1125, and a retransmission component 1130. The communications manager 1115 may be an example of aspects of the communications manager 1310 described herein.

The transmission component 1120 may transmit a message to a set of user equipment (UEs) over a single frequency network channel using a first beam sweep pattern.

The pattern identification component 1125 may identify a second beam sweep pattern from a set of beam sweep patterns that is different from the first beam sweep pattern for retransmissions of the message.

The retransmission component 1130 may transmit a retransmission of the message to the set of UEs over the single frequency network channel using the second beam sweep pattern.

The transmitter 1135 may transmit signals generated by other components of the device 1105. In some examples, the transmitter 1135 may be collocated with a receiver 1110 in a transceiver module. For example, the transmitter 1135 may be an example of aspects of the transceiver 1320 described with reference to FIG. 13. The transmitter 1135 may utilize a single antenna or a set of antennas.

Figure 12:
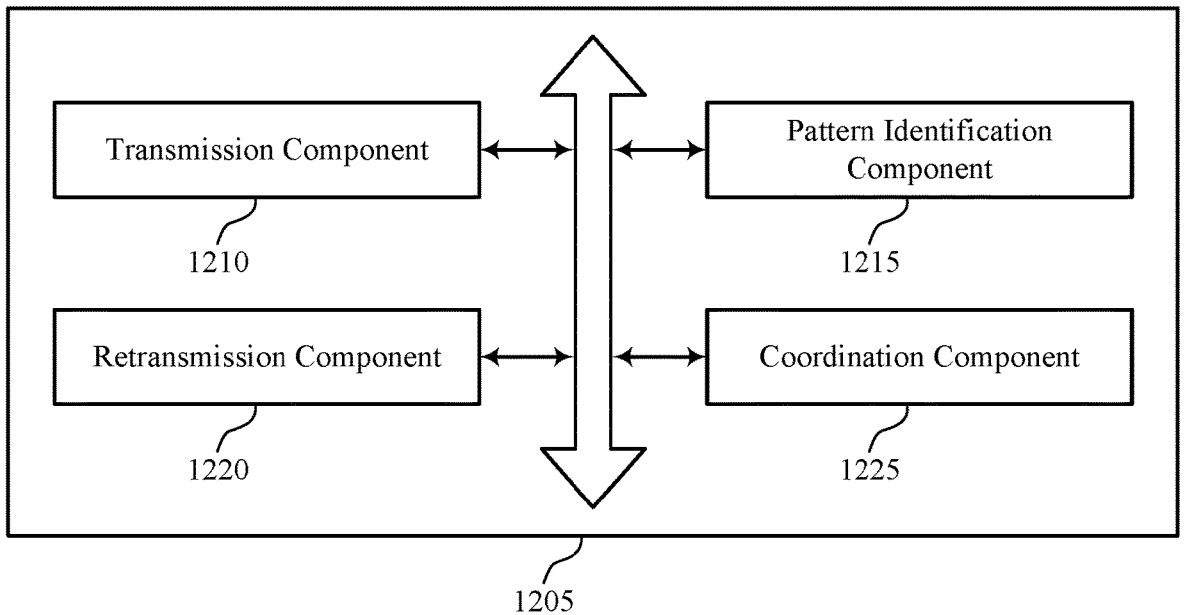
FIG. 12 shows a block diagram of a communications manager that supports beam sweeping patterns for single frequency network broadcast channel in accordance with aspects of the present disclosure.

FIG. 12 shows a block diagram 1200 of a communications manager 1205 that supports beam sweeping patterns for single frequency network broadcast channel in accordance with aspects of the present disclosure. The communications manager 1205 may be an example of aspects of a communications manager 1015, a communications manager 1115, or a communications manager 1310 described herein. The communications manager 1205 may include a transmission component 1210, a pattern identification component 1215, a retransmission component 1220, and a coordination component 1225. Each of these modules may communicate, directly or indirectly, with one another (e.g., via one or more buses).

The transmission component 1210 may transmit a message to a set of user equipment (UEs) over a single frequency network channel using a first beam sweep pattern.

In some examples, the transmission component 1210 may transmit an indication of the first beam sweep pattern, the second beam sweep pattern, or both.

In some examples, transmitting the message using the first beam sweep pattern includes transmitting a first set of beams in a first order, and where transmitting the message using the second beam sweep pattern includes transmitting a second set of beams in a second order that is different than the first order.

In some cases, the first set of beams and the second set of beams are transmitted according to a frequency division multiplexing technique, a time division multiplexing technique, or both.

The pattern identification component 1215 may identify a second beam sweep pattern from a set of beam sweep patterns that is different from the first beam sweep pattern for retransmissions of the message.

In some cases, the second beam sweep pattern is identified from the set of beam sweep patterns randomly.

The retransmission component 1220 may transmit a retransmission of the message to the set of UEs over the single frequency network channel using the second beam sweep pattern.

In some examples, the retransmission component 1220 may receive a negative acknowledgement associated with the message, where transmitting the retransmission of the message is based on receiving the negative acknowledgement.

In some examples, the retransmission component 1220 may transmit an indication indicating resources for receiving the retransmission of the message.

In some cases, the retransmission is transmitted automatically.

The coordination component 1225 may receive a coordination message from a network node indicating a beam sweep pattern coordination between the base station and the network node, where identifying the second beam sweep pattern is based on the coordination message.

Figure 13:
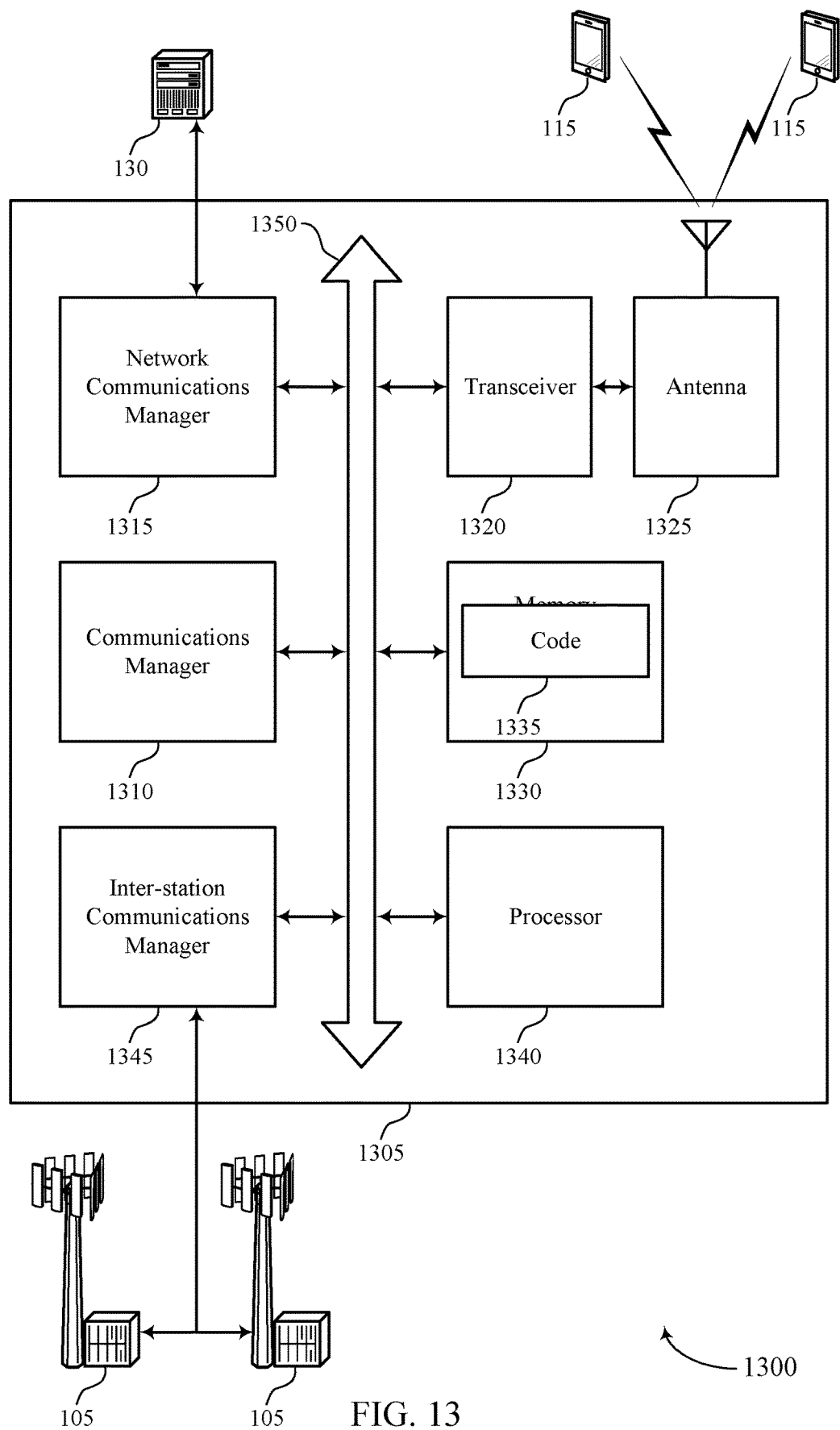
FIG. 13 shows a diagram of a system including a device that supports beam sweeping patterns for single frequency network broadcast channel in accordance with aspects of the present disclosure.

FIG. 13 shows a diagram of a system 1300 including a device 1305 that supports beam sweeping patterns for single frequency network broadcast channel in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may transmit a message to a set of user equipment (UEs) over a single frequency network channel using a first beam sweep pattern, identify a second beam sweep pattern from a set of beam sweep patterns that is different from the first beam sweep pattern for retransmissions of the message, and transmit a retransmission of the message to the set of UEs over the single frequency network channel using the second beam sweep pattern.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described herein. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting beam sweeping patterns for single frequency network broadcast channel).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

The actions performed by the processor 1340, memory 1330, I/O controller 1315, communications manager 1310, transceiver 1320, and antenna 1325 as described herein may be implemented to realize one or more potential advantages. One implementation may allow the device 1305 to save power and increase battery life by transmitting the retransmission of the message over the single frequency network channel using the second beam sweep pattern. Another implementation may provide improved data throughput and user experience at the device 1305 through the reduction of signaling overhead.

Figure 14:
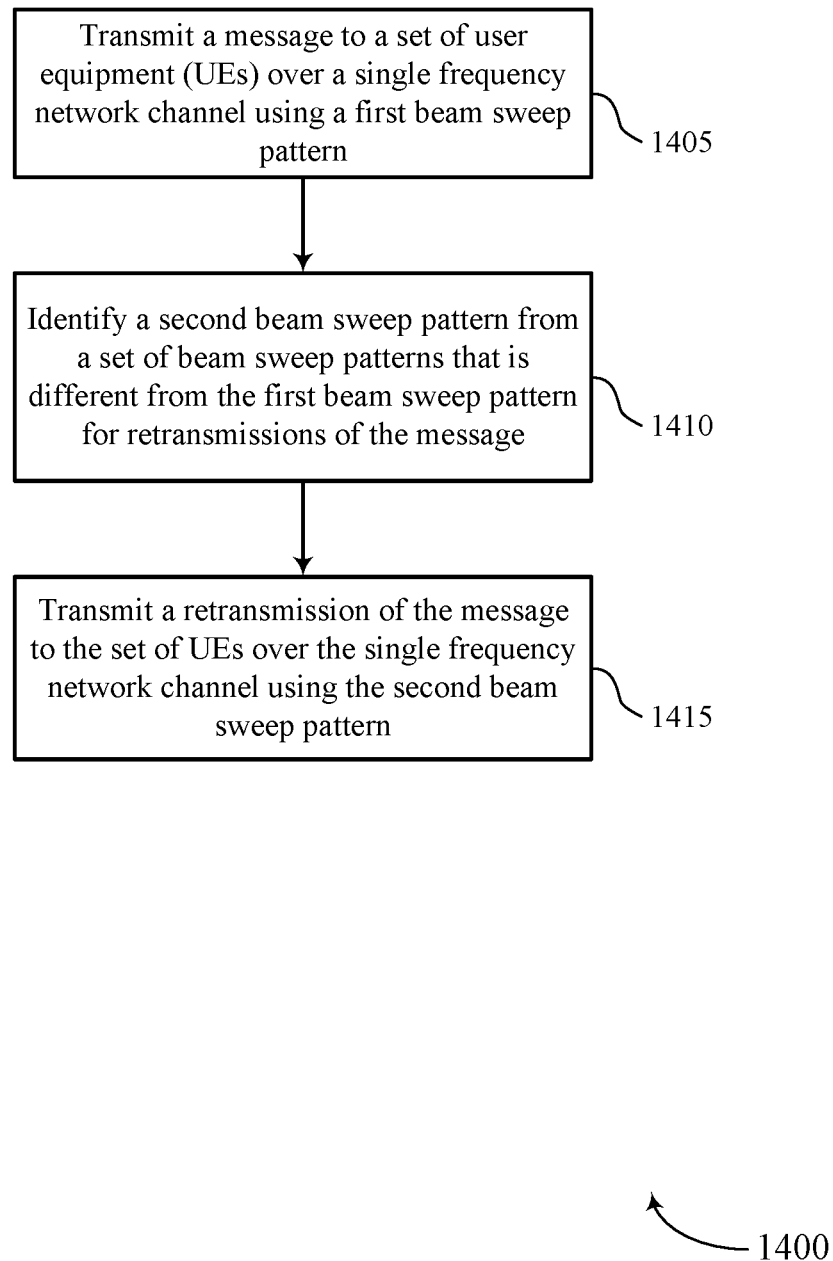
FIGS. 14 through 18 show flowcharts illustrating methods that support beam sweeping patterns for single frequency network broadcast channel in accordance with aspects of the present disclosure.

FIG. 14 shows a flowchart illustrating a method 1400 that supports beam sweeping patterns for single frequency network broadcast channel in accordance with aspects of the present disclosure. The operations of method 1400 may be implemented by a base station 105 or its components as described herein. For example, the operations of method 1400 may be performed by a communications manager as described with reference to FIGS. 10 through 13. In some examples, a base station may execute a set of instructions to control the functional elements of the base station to perform the functions described herein. Additionally or alternatively, a base station may perform aspects of the functions described herein using special-purpose hardware.

At 1405, the base station may transmit a message to a set of user equipment (UEs) over a single frequency network channel using a first beam sweep pattern. The operations of 1405 may be performed according to the methods described herein. In some examples, aspects of the operations of 1405 may be performed by a transmission component as described with reference to FIGS. 10 through 13.

At 1410, the base station may identify a second beam sweep pattern from a set of beam sweep patterns that is different from the first beam sweep pattern for retransmissions of the message. The operations of 1410 may be performed according to the methods described herein. In some examples, aspects of the operations of 1410 may be performed by a pattern identification component as described with reference to FIGS. 10 through 13.

At 1415, the base station may transmit a retransmission of the message to the set of UEs over the single frequency network channel using the second beam sweep pattern. The operations of 1415 may be performed according to the methods described herein. In some examples, aspects of the operations of 1415 may be performed by a retransmission component as described with reference to FIGS. 10 through 13.

Figure 15:
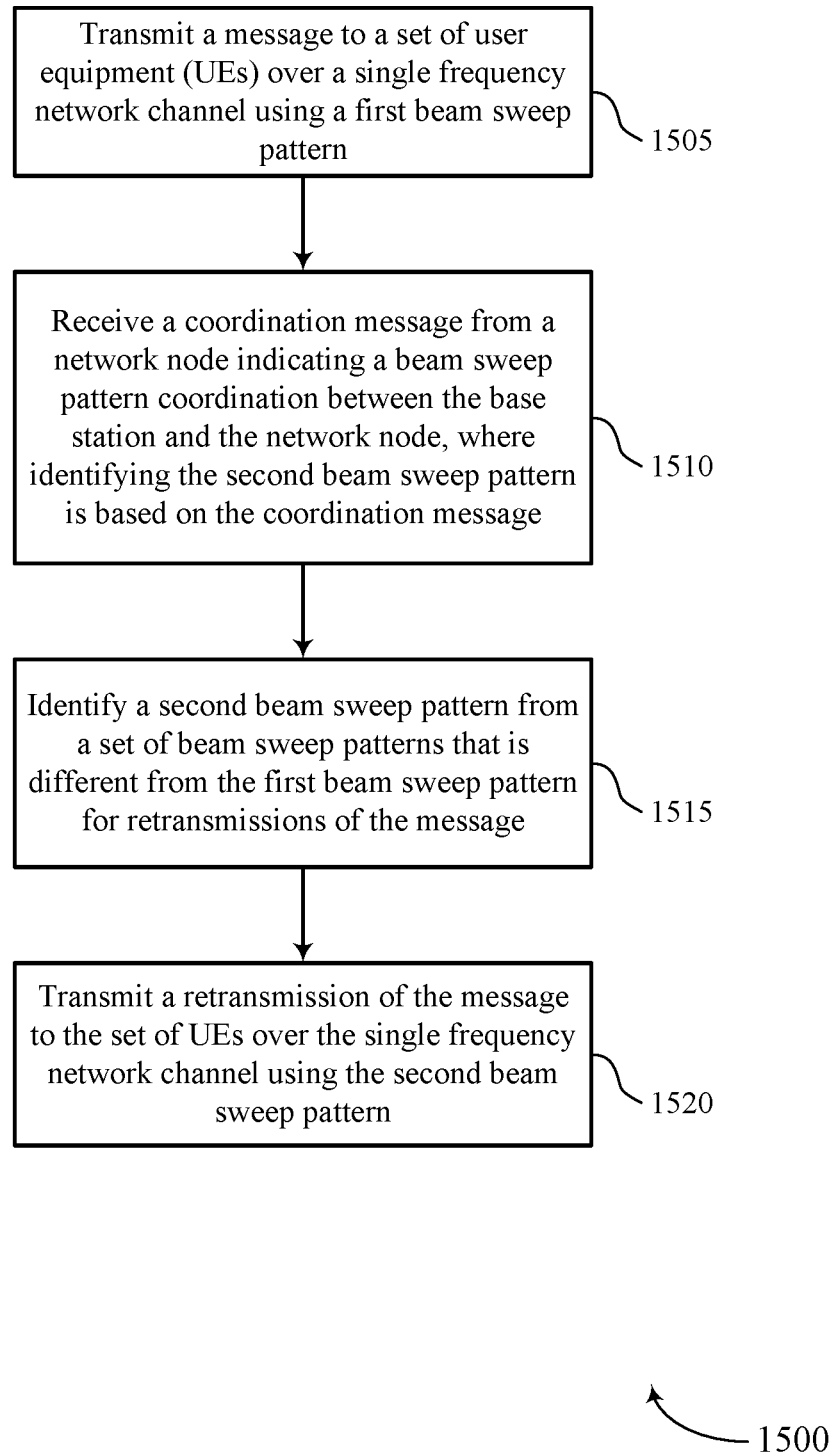

FIG. 15 shows a flowchart illustrating a method 1500 that supports beam sweeping patterns for single frequency network broadcast channel in accordance with aspects of the present disclosure. The operations of method 1500 may be implemented by a base station 105 or its components as described herein. For example, the operations of method 1500 may be performed by a communications manager as described with reference to FIGS. 10 through 13. In some examples, a base station may execute a set of instructions to control the functional elements of the base station to perform the functions described herein. Additionally or alternatively, a base station may perform aspects of the functions described herein using special-purpose hardware.

At 1505, the base station may transmit a message to a set of user equipment (UEs) over a single frequency network channel using a first beam sweep pattern. The operations of 1505 may be performed according to the methods described herein. In some examples, aspects of the operations of 1505 may be performed by a transmission component as described with reference to FIGS. 10 through 13.

At 1510, the base station may receive a coordination message from a network node indicating a beam sweep pattern coordination between the base station and the network node, where identifying the second beam sweep pattern is based on the coordination message. The operations of 1510 may be performed according to the methods described herein. In some examples, aspects of the operations of 1510 may be performed by a coordination component as described with reference to FIGS. 10 through 13.

At 1515, the base station may identify a second beam sweep pattern from a set of beam sweep patterns that is different from the first beam sweep pattern for retransmissions of the message. The operations of 1515 may be performed according to the methods described herein. In some examples, aspects of the operations of 1515 may be performed by a pattern identification component as described with reference to FIGS. 10 through 13.

At 1520, the base station may transmit a retransmission of the message to the set of UEs over the single frequency network channel using the second beam sweep pattern. The operations of 1520 may be performed according to the methods described herein. In some examples, aspects of the operations of 1520 may be performed by a retransmission component as described with reference to FIGS. 10 through 13.

Figure 16:
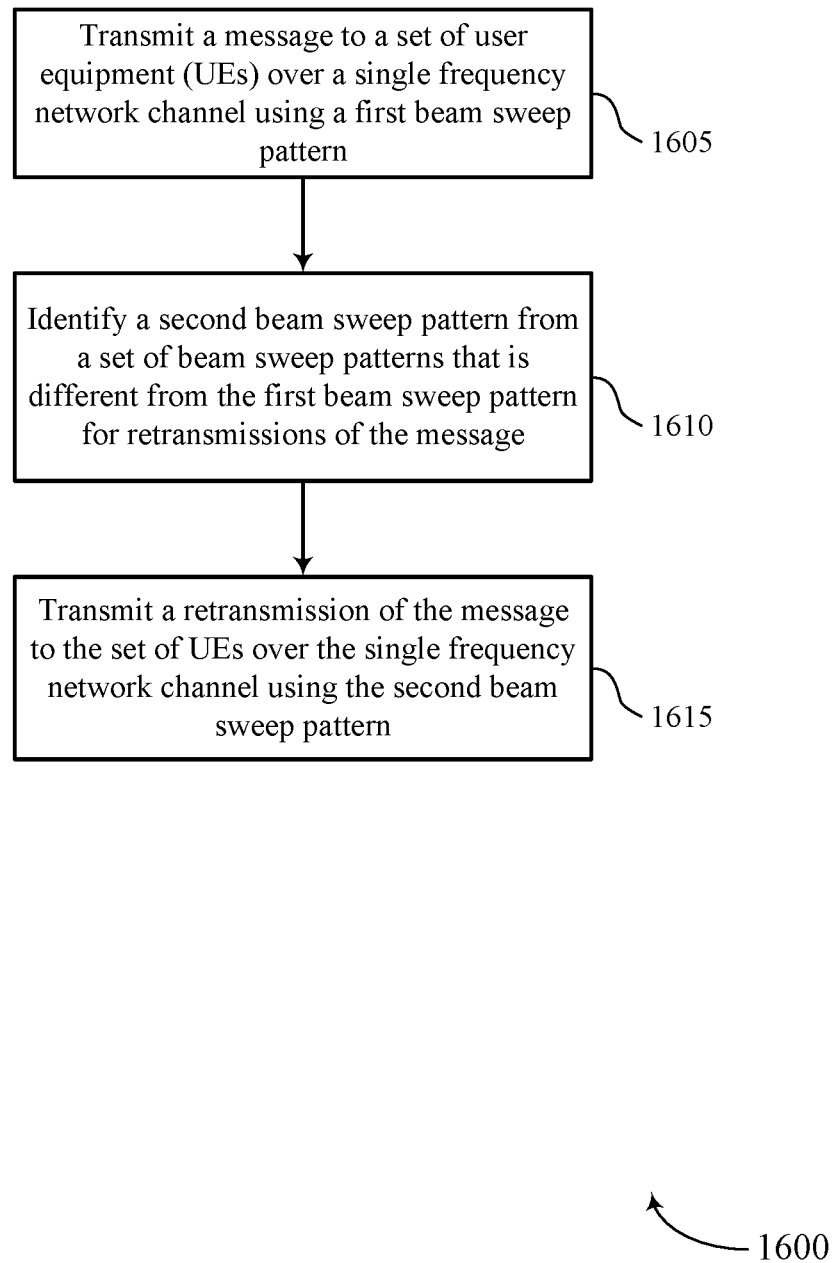

FIG. 16 shows a flowchart illustrating a method 1600 that supports beam sweeping patterns for single frequency network broadcast channel in accordance with aspects of the present disclosure. The operations of method 1600 may be implemented by a base station 105 or its components as described herein. For example, the operations of method 1600 may be performed by a communications manager as described with reference to FIGS. 10 through 13. In some examples, a base station may execute a set of instructions to control the functional elements of the base station to perform the functions described herein. Additionally or alternatively, a base station may perform aspects of the functions described herein using special-purpose hardware.

At 1605, the base station may transmit a message to a set of user equipment (UEs) over a single frequency network channel using a first beam sweep pattern. The operations of 1605 may be performed according to the methods described herein. In some examples, aspects of the operations of 1605 may be performed by a transmission component as described with reference to FIGS. 10 through 13.

At 1610, the base station may identify a second beam sweep pattern from a set of beam sweep patterns that is different from the first beam sweep pattern for retransmissions of the message. The operations of 1610 may be performed according to the methods described herein. In some examples, aspects of the operations of 1610 may be performed by a pattern identification component as described with reference to FIGS. 10 through 13.

At 1615, the base station may transmit a retransmission of the message to the set of UEs over the single frequency network channel using the second beam sweep pattern. The operations of 1615 may be performed according to the methods described herein. In some examples, aspects of the operations of 1615 may be performed by a retransmission component as described with reference to FIGS. 10 through 13.

Figure 17:
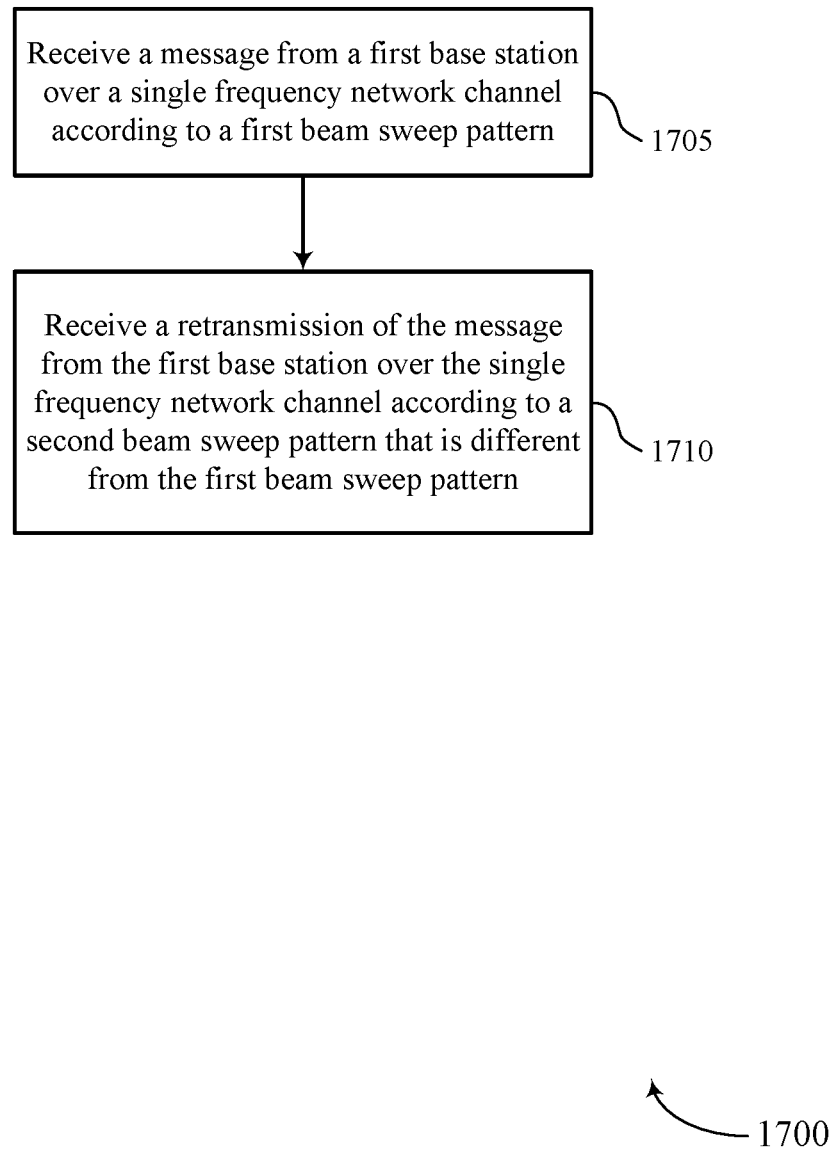

FIG. 17 shows a flowchart illustrating a method 1800 that supports beam sweeping patterns for single frequency network broadcast channel in accordance with aspects of the present disclosure. The operations of method 1800 may be implemented by a UE 115 or its components as described herein. For example, the operations of method 1800 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1805, the UE may receive a message from a first base station over a single frequency network channel according to a first beam sweep pattern. The operations of 1805 may be performed according to the methods described herein. In some examples, aspects of the operations of 1805 may be performed by a transmission component as described with reference to FIGS. 6 through 9.

At 1810, the UE may receive a retransmission of the message from the first base station over the single frequency network channel according to a second beam sweep pattern that is different from the first beam sweep pattern. The operations of 1810 may be performed according to the methods described herein. In some examples, aspects of the operations of 1810 may be performed by a retransmission component as described with reference to FIGS. 6 through 9.

Figure 18:
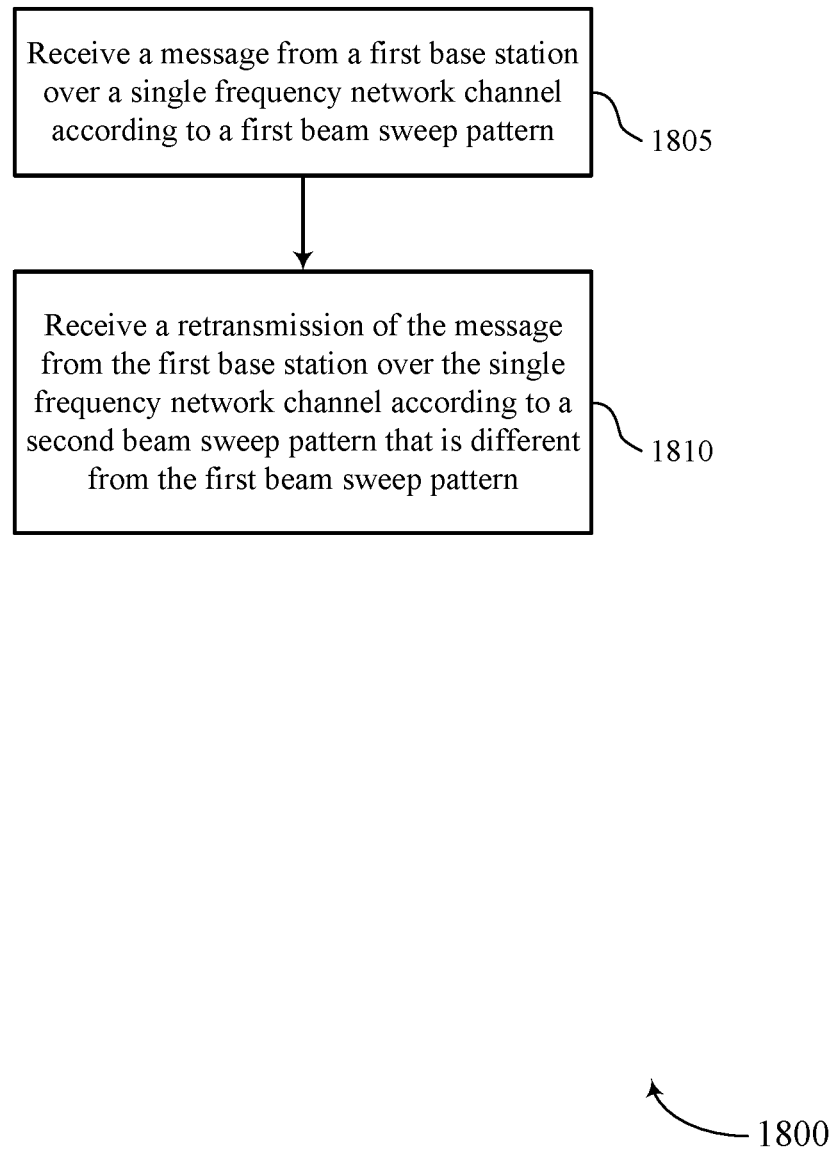

FIG. 18 shows a flowchart illustrating a method 1800 that supports beam sweeping patterns for single frequency network broadcast channel in accordance with aspects of the present disclosure. The operations of method 1800 may be implemented by a UE 115 or its components as described herein. For example, the operations of method 1800 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1805, the UE may receive a message from a first base station over a single frequency network channel according to a first beam sweep pattern. The operations of 1805 may be performed according to the methods described herein. In some examples, aspects of the operations of 1805 may be performed by a transmission component as described with reference to FIGS. 6 through 9.

At 1810, the UE may receive a retransmission of the message from the first base station over the single frequency network channel according to a second beam sweep pattern that is different from the first beam sweep pattern. The operations of 1810 may be performed according to the methods described herein. In some examples, aspects of the operations of 1810 may be performed by a retransmission component as described with reference to FIGS. 6 through 9.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communications at a base station, comprising: transmitting a message to a plurality of user equipment (UEs) over a single frequency network channel using a first beam sweep pattern; identifying a second beam sweep pattern from a plurality of beam sweep patterns that is different from the first beam sweep pattern for retransmissions of the message; and transmitting a retransmission of the message to the plurality of UEs over the single frequency network channel using the second beam sweep pattern.

Aspect 2: The method of aspect 1, further comprising: transmitting an indication of the first beam sweep pattern, the second beam sweep pattern, or both.

Aspect 3: The method of any of aspects 1 through 2, further comprising: receiving a negative acknowledgement associated with the message, wherein transmitting the retransmission of the message is based at least in part on receiving the negative acknowledgement.

Aspect 4: The method of any of aspects 1 through 3, wherein the retransmission is transmitted automatically.

Aspect 5: The method of any of aspects 1 through 4, further comprising: transmitting an indication indicating resources for receiving the retransmission of the message.

Aspect 6: The method of any of aspects 1 through 5, further comprising: receiving a coordination message from a network node indicating a beam sweep pattern coordination between the base station and the network node, wherein identifying the second beam sweep pattern is based at least in part on the coordination message.

Aspect 7: The method of any of aspects 1 through 6, wherein the second beam sweep pattern is identified from the plurality of beam sweep patterns based at least in part on a random selection, a rule, or both.

Aspect 8: The method of any of aspects 1 through 7, wherein transmitting the message using the first beam sweep pattern comprises transmitting a first plurality of beams in a first order, and wherein transmitting the message using the second beam sweep pattern comprises transmitting a second plurality of beams in a second order that is different than the first order.

Aspect 9: The method of aspect 8, wherein the first plurality of beams and the second plurality of beams are transmitted according to a frequency division multiplexing technique, a time division multiplexing technique, or both.

Aspect 10: The method of any of aspects 1 through 9, wherein the single frequency network channel comprises a multimedia broadcast single frequency network channel.

Aspect 11: A method for wireless communications at a UE, comprising: receiving a message from a first base station over a single frequency network channel according to a first beam sweep pattern; and receiving a retransmission of the message from the first base station over the single frequency network channel according to a second beam sweep pattern that is different from the first beam sweep pattern.

Aspect 12: The method of aspect 11, further comprising: receiving an indication of the first beam sweep pattern, the second beam sweep pattern, or both.

Aspect 13: The method of aspect 12, further comprising: identifying the first beam sweep pattern, the second beam sweep pattern, or both, based at least in part on the indication.

Aspect 14: The method of aspect 13, wherein the indication comprises an explicit indication of the first beam sweep pattern, the second beam sweep pattern, or both, or a rule.

Aspect 15: The method of any of aspects 11 through 14, further comprising: transmitting a negative acknowledgement associated with the message, wherein receiving the retransmission of the message is based at least in part on transmitting the negative acknowledgement.

Aspect 16: The method of any of aspects 11 through 15, further comprising: receiving an indication indicating resources for receiving the retransmission of the message.

Aspect 17: The method of any of aspects 11 through 16, wherein the single frequency network channel comprises a multimedia broadcast single frequency network channel.

Aspect 18: An apparatus for wireless communications at a base station, comprising a processor; memory coupled with the processor; and instructions stored in the memory and executable by the processor to cause the apparatus to perform a method of any of aspects 1 through 10.

Aspect 19: An apparatus for wireless communications at a base station, comprising at least one means for performing a method of any of aspects 1 through 10.

Aspect 20: A non-transitory computer-readable medium storing code for wireless communications at a base station, the code comprising instructions executable by a processor to perform a method of any of aspects 1 through 10.

Aspect 21: An apparatus for wireless communications at a UE, comprising a processor; memory coupled with the processor; and instructions stored in the memory and executable by the processor to cause the apparatus to perform a method of any of aspects 11 through 17.

Aspect 22: An apparatus for wireless communications at a UE, comprising at least one means for performing a method of any of aspects 11 through 17.

Aspect 23: A non-transitory computer-readable medium storing code for wireless communications at a UE, the code comprising instructions executable by a processor to perform a method of any of aspects 11 through 17.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a first network device, comprising:
   transmitting, using a first beam sweep pattern that is common across a plurality of network devices as part of a single frequency network transmission coordination between the plurality of network devices including the first network device, a message to a plurality of user equipment (UEs) over a single frequency network channel;
   identifying a second beam sweep pattern from a plurality of beam sweep patterns that is different from the common first beam sweep pattern for retransmissions of the message; and
   transmitting a retransmission of the message to the plurality of UEs over the single frequency network channel using the second beam sweep pattern.

2. The method of claim 1, further comprising:
transmitting an indication of the common first beam sweep pattern, the second beam sweep pattern, or both.

3. The method of claim 1, further comprising:
receiving a negative acknowledgement associated with the message, wherein transmitting the retransmission of the message is based at least in part on receiving the negative acknowledgement.

4. The method of claim 1, wherein the retransmission is transmitted automatically.

5. The method of claim 1, further comprising:
transmitting an indication indicating resources for receiving the retransmission of the message.

6. The method of claim 1, further comprising:
receiving a coordination message from a network node indicating a beam sweep pattern coordination between the first network device and the network node, wherein identifying the second beam sweep pattern is based at least in part on the coordination message.

7. The method of claim 1, wherein the second beam sweep pattern is identified from the plurality of beam sweep patterns based at least in part on a random selection, a rule, or both.

8. The method of claim 1, wherein:
transmitting the message using the common first beam sweep pattern comprises transmitting a first plurality of beams in a first order, and wherein transmitting the message using the second beam sweep pattern comprises transmitting a second plurality of beams in a second order that is different than the first order.

9. The method of claim 8, wherein the first plurality of beams and the second plurality of beams are transmitted according to a frequency division multiplexing technique, a time division multiplexing technique, or both.

10. The method of claim 1, wherein the single frequency network channel comprises a multimedia broadcast single frequency network channel.

11. A method for wireless communications at a user equipment (UE), comprising:
receiving a message from a first network device over a single frequency network channel according to a first beam sweep pattern that is common across a plurality of network devices as part of a single frequency network transmission coordination between the plurality of network devices including the first network device; and
receiving a retransmission of the message from the first network device over the single frequency network channel according to a second beam sweep pattern that is different from the common first beam sweep pattern.

12. The method of claim 11, further comprising:
receiving an indication of the common first beam sweep pattern, the second beam sweep pattern, or both.

13. The method of claim 12, further comprising:
identifying the common first beam sweep pattern, the second beam sweep pattern, or both, based at least in part on the indication.

14. The method of claim 13, wherein the indication comprises an explicit indication of the common first beam sweep pattern, the second beam sweep pattern, or both, or a rule.

15. The method of claim 11, further comprising:
transmitting a negative acknowledgement associated with the message, wherein receiving the retransmission of the message is based at least in part on transmitting the negative acknowledgement.

16. The method of claim 11, further comprising:
receiving an indication indicating resources for receiving the retransmission of the message.

17. The method of claim 11, wherein the single frequency network channel comprises a multimedia broadcast single frequency network channel.

18. An apparatus for wireless communications at a first network device, comprising:
a processor;
memory coupled with the processor; and
instructions stored in the memory and executable by the processor to cause the apparatus to:
transmit, using a first beam sweep pattern that is common across a plurality of network devices as part of a single frequency network transmission coordination between the plurality of network devices including the first network device, a message to a plurality of user equipment (UEs) over a single frequency network channel;
identify a second beam sweep pattern from a plurality of beam sweep patterns that is different from the common first beam sweep pattern for retransmissions of the message; and
transmit a retransmission of the message to the plurality of UEs over the single frequency network channel using the second beam sweep pattern.

19. The apparatus of claim 18, wherein the instructions are further executable by the processor to cause the apparatus to:
transmit an indication of the common first beam sweep pattern, the second beam sweep pattern, or both.

20. The apparatus of claim 18, wherein the instructions are further executable by the processor to cause the apparatus to:
receive a negative acknowledgement associated with the message, wherein transmitting the retransmission of the message is based at least in part on receiving the negative acknowledgement.

21. The apparatus of claim 18, wherein the retransmission is transmitted automatically.

22. The apparatus of claim 18, wherein the instructions are further executable by the processor to cause the apparatus to:
transmit an indication indicating resources for receiving the retransmission of the message.

23. The apparatus of claim 18, wherein the instructions are further executable by the processor to cause the apparatus to:
receive a coordination message from a network node indicating a beam sweep pattern coordination between the first network device and the network node, wherein identifying the second beam sweep pattern is based at least in part on the coordination message.

24. The apparatus of claim 18, wherein the second beam sweep pattern is identified from the plurality of beam sweep patterns based at least in part on a random selection, a rule, or both.

25. The apparatus of claim 18, wherein the instructions to transmit the message using the common first beam sweep pattern are executable by the processor to cause the apparatus to transmit a first plurality of beams in a first order, and wherein transmitting the message using the second beam sweep pattern comprises transmitting a second plurality of beams in a second order that is different than the first order.

26. The apparatus of claim 25, wherein the first plurality of beams and the second plurality of beams are transmitted according to a frequency division multiplexing technique, a time division multiplexing technique, or both.

27. The apparatus of claim 18, wherein the single frequency network channel comprises a multimedia broadcast single frequency network channel.

28. An apparatus for wireless communications at a user equipment (UE), comprising:
  a processor,
  memory coupled with the processor; and
  instructions stored in the memory and executable by the processor to cause the apparatus to:
    receive a message from a first network device over a single frequency network channel according to a first beam sweep pattern that is common across a plurality of network devices as part of a single frequency network transmission coordination between the plurality of network devices including the first network device; and
    receive a retransmission of the message from the first network device over the single frequency network channel according to a second beam sweep pattern that is different from the common first beam sweep pattern.

29. The apparatus of claim 28, wherein the instructions are further executable by the processor to cause the apparatus to:
  receive an indication of the common first beam sweep pattern, the second beam sweep pattern, or both.

30. The apparatus of claim 28, wherein the instructions are further executable by the processor to cause the apparatus to:
  transmit a negative acknowledgement associated with the message, wherein receiving the retransmission of the message is based at least in part on transmitting the negative acknowledgement.

* * * * *